United States Patent
Eubank et al.

(10) Patent No.: US 12,411,861 B2
(45) Date of Patent: *Sep. 9, 2025

(54) UTILIZING APPROPRIATE MEASURE AGGREGATION FOR GENERATING DATA VISUALIZATIONS OF MULTI-FACT DATASETS

(71) Applicant: Tableau Software, Inc., Seattle, WA (US)

(72) Inventors: Christian Eubank, Seattle, WA (US); Justin Talbot, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,946

(22) Filed: Apr. 18, 2024

(65) Prior Publication Data
US 2024/0265025 A1 Aug. 8, 2024

Related U.S. Application Data

(63) Continuation of application No. 16/570,969, filed on Sep. 13, 2019, now Pat. No. 11,966,406, which is a
(Continued)

(51) Int. Cl.
*G06F 16/248* (2019.01)
*G06F 16/22* (2019.01)
*G06F 16/2455* (2019.01)

(52) U.S. Cl.
CPC ........ *G06F 16/248* (2019.01); *G06F 16/2282* (2019.01); *G06F 16/24556* (2019.01); *G06F 16/2456* (2019.01)

(58) Field of Classification Search
None
See application file for complete search history.

(56) References Cited

U.S. PATENT DOCUMENTS

| 5,511,186 A | 4/1996 | Carhart et al. |
| 5,917,492 A | 6/1999 | Bereiter et al. |

(Continued)

OTHER PUBLICATIONS

Borden, Preinterview First Office Action, U.S. Appl. No. 16/905,819, Oct. 28, 2021, 4 pgs.
(Continued)

*Primary Examiner* — Dawaune A Conyers
(74) *Attorney, Agent, or Firm* — Morgan, Lewis & Bockius LLP

(57) ABSTRACT

A computer receives user selection of data fields from a data source and user placement of the data fields into a shelf region of a user interface. The computer obtains a data model encoding the data source as a tree of related logical tables. Each logical table includes logical fields, each of which corresponds to either a dimension or a measure. The computer generates a dimension subquery for the dimensions. The computer also generates, for each measure, an aggregated measure subquery grouped by the dimensions. The computer forms a final query by joining the dimension subquery to each of the aggregated measure subqueries. The computer subsequently executes the final query and displays a data visualization according to the results of the final query.

20 Claims, 27 Drawing Sheets

Related U.S. Application Data continuation-in-part of application No. 16/236,611, filed on Dec. 30, 2018, now Pat. No. 11,966,568.

(60) Provisional application No. 62/748,968, filed on Oct. 22, 2018.

(56) References Cited

U.S. PATENT DOCUMENTS

| | | |
|---|---|---|
| 6,189,004 B1 | 2/2001 | Rassen et al. |
| 6,199,063 B1 | 3/2001 | Colby et al. |
| 6,212,524 B1 | 4/2001 | Weissman et al. |
| 6,385,604 B1 | 5/2002 | Bakalash et al. |
| 6,492,989 B1 | 12/2002 | Wilkinson |
| 6,532,471 B1 | 3/2003 | Ku et al. |
| 6,807,539 B2 | 10/2004 | Miller et al. |
| 7,023,453 B2 | 4/2006 | Wilkinson |
| 7,039,650 B2 | 5/2006 | Adams et al. |
| 7,176,924 B2 | 2/2007 | Wilkinson |
| 7,290,007 B2 | 10/2007 | Farber et al. |
| 7,302,447 B2 | 11/2007 | Dettinger et al. |
| 7,337,163 B1 | 2/2008 | Srinivasan et al. |
| 7,426,520 B2 | 9/2008 | Gorelik et al. |
| 7,800,613 B2 | 9/2010 | Hanrahan et al. |
| 7,941,521 B1 | 5/2011 | Petrov et al. |
| 8,082,243 B2 | 12/2011 | Gorelik et al. |
| 8,442,999 B2 | 5/2013 | Gorelik et al. |
| 8,874,613 B2 | 10/2014 | Gorelik et al. |
| 9,165,029 B2 | 10/2015 | Bhoovaraghavan et al. |
| 9,336,253 B2 | 5/2016 | Gorelik et al. |
| 9,563,674 B2 | 2/2017 | Hou et al. |
| 9,613,086 B1* | 4/2017 | Sherman ............... G06F 16/248 |
| 9,710,527 B1 | 7/2017 | Sherman |
| 9,779,150 B1 | 10/2017 | Sherman et al. |
| 2001/0054034 A1 | 12/2001 | Arning et al. |
| 2002/0055939 A1 | 5/2002 | Nardone et al. |
| 2003/0004959 A1 | 1/2003 | Kotsis et al. |
| 2003/0023608 A1 | 1/2003 | Egilsson et al. |
| 2004/0103088 A1 | 5/2004 | Cragun et al. |
| 2004/0122844 A1 | 6/2004 | Malloy et al. |
| 2004/0139061 A1 | 7/2004 | Colosi et al. |
| 2004/0243593 A1 | 12/2004 | Stolte et al. |
| 2005/0038767 A1 | 2/2005 | Verschell et al. |
| 2005/0060300 A1 | 3/2005 | Stolte et al. |
| 2005/0182703 A1 | 8/2005 | D'hers et al. |
| 2006/0010143 A1 | 1/2006 | Netz et al. |
| 2006/0167924 A1 | 7/2006 | Bradlee et al. |
| 2006/0173813 A1 | 8/2006 | Zorola |
| 2006/0206512 A1 | 9/2006 | Hanrahan et al. |
| 2006/0294081 A1 | 12/2006 | Dettinger et al. |
| 2006/0294129 A1 | 12/2006 | Stanfill et al. |
| 2007/0006139 A1 | 1/2007 | Rubin |
| 2007/0156734 A1 | 7/2007 | Dipper et al. |
| 2008/0016026 A1 | 1/2008 | Farber et al. |
| 2008/0027957 A1 | 1/2008 | Bruckner et al. |
| 2009/0006370 A1 | 1/2009 | Li et al. |
| 2009/0319548 A1 | 12/2009 | Brown et al. |
| 2010/0005054 A1 | 1/2010 | Smith et al. |
| 2010/0005114 A1* | 1/2010 | Dipper ............... G06F 16/283 707/E17.054 |
| 2010/0077340 A1 | 3/2010 | French et al. |
| 2011/0131250 A1 | 6/2011 | Stolte et al. |
| 2012/0116850 A1 | 5/2012 | Abe et al. |
| 2012/0117453 A1 | 5/2012 | Mackinlay et al. |
| 2012/0284670 A1 | 11/2012 | Kashik et al. |
| 2013/0080584 A1 | 3/2013 | Benson |
| 2013/0159307 A1 | 6/2013 | Wolge et al. |
| 2013/0166498 A1 | 6/2013 | Aski et al. |
| 2013/0191418 A1 | 7/2013 | Martin, Jr. et al. |
| 2014/0181151 A1 | 6/2014 | Mazoue |
| 2014/0189553 A1 | 7/2014 | Bleizeffer et al. |
| 2015/0039912 A1 | 2/2015 | Payton et al. |
| 2015/0261728 A1 | 9/2015 | Davis |
| 2015/0278371 A1 | 10/2015 | Anand et al. |
| 2016/0092530 A1 | 3/2016 | Jakubiak et al. |
| 2016/0092601 A1 | 3/2016 | Lamas et al. |
| 2017/0132277 A1* | 5/2017 | Hsiao ............... G06F 16/2425 |
| 2017/0357693 A1* | 12/2017 | Kumar ............ G06F 16/24556 |
| 2018/0024981 A1 | 1/2018 | Xia et al. |
| 2018/0129513 A1 | 5/2018 | Gloystein et al. |
| 2018/0336223 A1 | 11/2018 | Kapoor et al. |
| 2019/0065565 A1 | 2/2019 | Stolte et al. |
| 2019/0108272 A1 | 4/2019 | Talbot et al. |
| 2020/0073876 A1 | 3/2020 | Lopez et al. |
| 2020/0125559 A1 | 4/2020 | Talbot et al. |
| 2020/0233905 A1 | 7/2020 | Williams et al. |

OTHER PUBLICATIONS

Borden, Notice of Allowance, U.S. Appl. No. 16/905,819, Nov. 24, 2021, 19 pgs.

Eubank, Office Action, U.S. Appl. No. 16/579,762, Feb. 19, 2021, 9 pgs.

Eubank, Notice of Allowance, U.S. Appl. No. 16/579,762, Aug. 18, 2021, 15 pgs.

Eubank, Office Action, U.S. Appl. No. 16/570,969, Jun. 15, 2021, 12 pgs.

Eubank, Final Office Action, U.S. Appl. No. 16/570,969, Dec. 1, 2021, 12 pgs.

Eubank, Notice of Allowance, U.S. Appl. No. 16/570,969, Dec. 18, 2023, 7 pgs.

Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article=1091&context=ece_etds, 87 pgs.

Gyldenege, Preinterview First Office Action, U.S. Appl. No. 16/221,413, Jun. 11, 2020, 4 pgs.

Gyldenege, First Action Interview Office Action, U.S. Appl. No. 16/221,413, Jul. 27, 2020, 4 pgs.

Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.

Milligan et al., (Tableau 10 Complete Reference, Copyright © 2018 Packt Publishing Ltd., ISBN 978-1-78995-708-2, Electronic edition excerpts retrieved on [Sep. 23, 2020] from [https://learning.orelly.com/], 144 pages (Year: 2018).

"Mondrian 3.0.4 Technical Guide," 2009 (Year: 2009).

Morton, Office Action, U.S. Appl. No. 14/054,803, Sep. 11, 2015, 22 pgs.

Morton, Final Office Action, U.S. Appl. No. 14/054,803, May 11, 2016, 22 pgs.

Morton, Notice of Allowance, U.S. Appl. No. 14/054,803, Mar. 1, 2017, 23 pgs.

Morton, Preinterview 1st Office Action, U.S. Appl. No. 15/497,130, Sep. 18, 2019, 6 pgs.

Morton, First Action Interview Office Action, U.S. Appl. No. 15/497,130, Feb. 19, 2020, 26 pgs.

Morton, Final Office Action, U.S. Appl. No. 15/497,130, Aug. 12, 2020, 19 pgs.

Sleeper, Ryan (Practical Tableau, Copyright © 2018 Evolytics and Ryan Sleeper, Published by OP'Reilly Media, Inc., ISBN 978-1-491-97719-6, Electronic editionexcerpts retrieved on [Sep. 23, 2020] from [https://learning.oreilly.com/], 101 pages, (Year: 2018).

Morton, Office Action, U.S. Appl. No. 15/497,130, Jan. 8, 2021, 20 pgs.

Song et al., "SAMSTAR," Data Warehousing and OLAP, ACM, 2 Penn Plaza, Suite 701, New York, NY, Nov. 9, 2007, XP058133701, pp. 9 to 16, 8 pgs.

Tableau Software, Inc., International Search Report and Written Opinion, PCTUS2019056491, Jan. 2, 2020, 11 pgs.

Tableau Software, Inc., International Search Report and Written Opinion, PCTUS2018/044878, Oct. 22, 2018, 15 pgs.

Tableau Software, Inc., International Preliminary Report on Patentability, PCTUS2018/044878, Apr. 14, 2020, 12 pgs.

Tableau Software, Inc., International Search Report and Written Opinion, PCT/US2020/045461, Oct. 28, 2020.

(56) References Cited

OTHER PUBLICATIONS

Tableau All Releases, retrieved on [Oct. 2, 2020] from [https://www.tableau.com/products/all-features], (Year: 2020], 49 pgs.
Talbot, Office Action, U.S. Appl. No. 14/801,750, May 7, 2018, 60 pgs.
Talbot, Final Office Action, U.S. Appl. No. 14/801,750, Nov. 28, 2018, 63 pgs.
Talbot, Office Action, U.S. Appl. No. 14/801,750. Jun. 24, 2019, 55 pgs.
Talbot, Final Office Action, U.S. Appl. No. 15/911,026, Dec. 16, 2020, 28 pgs.
Talbot, Preinterview First Office Action, U.S. Appl. No. 16/236,611, Oct. 28, 2020, 6 pgs.
Talbot, First Action Interview Office Action, U.S. Appl. No. 16/236,611, Dec. 22, 2020, 5 pgs.
Talbot, Final Office Action, U.S. Appl. No. 16/236,611, Apr. 27, 2021, 21 pgs.
Talbot, Preinterview First Office Action, U.S. Appl. No. 16/236,612, Oct. 29, 2020, 6 pgs.
Talbot, First Action Interview Office Action, U.S. Appl. No. 16/236,612, Dec. 22, 2020, 5 pgs.
Talbot, Final Office Action, U.S. Appl. No. 16/236,612, Apr. 28, 2021, 20 pgs.
Talbot, Office Action, U.S. Appl. No. 16/236,611, Oct. 4, 2021, 18 pgs.
Talbot, Office Action, U.S. Appl. No. 16/236,612, Oct. 5, 2021, 22 pgs.
Talbot, Notice of Allowance, U.S. Appl. No. 16/236,612, Aug. 3, 2022, 15 pgs.
Talbot, Notice of Allowance, U.S. Appl. No. 16/236,611, Dec. 13, 2023, 8 pgs.
Trishla Maru, "Running Analytics on SAP HANA and BW with MicroStrategy," Dec. 25, 2016, XP055738162, from https://silo.tips/download/running-analytics-on-sap-hana-and-bw-with-microstrategy, 37 pgs.

\* cited by examiner

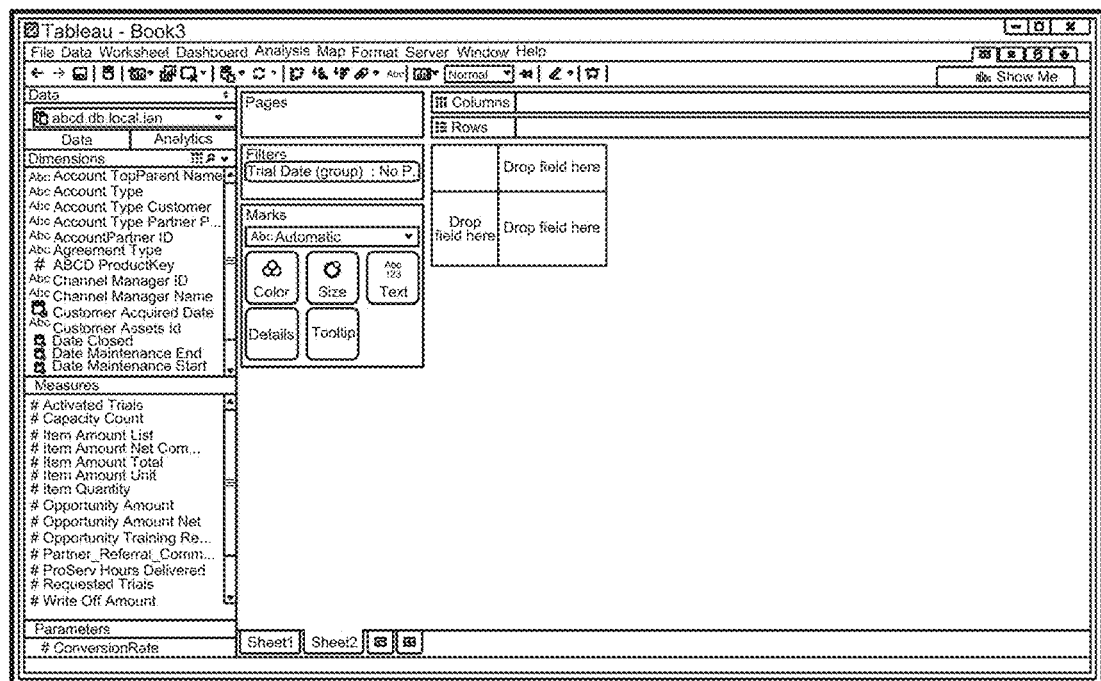
Data Visualization User Interface 102

104
Visual Specification:
identifies the Data Sources;
identifies the data fields assigned to
visual variables 108
Object Model for
the Data Sources 110
Group the data fields in the Visual
Specification into one or more data field
sets according to the Object Model of
the Data Sources 112
Query the Data
Sources for the
first data field set

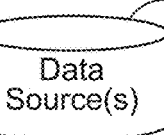
106
Data
Source(s)

114
Query the Data
Sources for the
second data field set

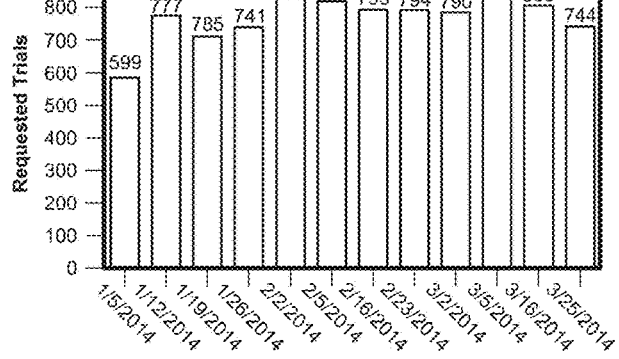
Data Visualization 122

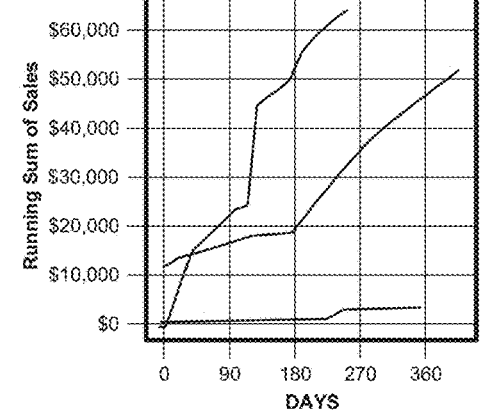
Data Visualization 124

| ⬛ Columns | | |
|---|---|---|
| ≣ Rows | (Region) | (Category) |

U

| Region | Category | |
|---|---|---|
| Central | Furniture | Abc |
| | Office Supplies | Abc |
| | Technology | Abc |
| East | Furniture | Abc |
| | Office Supplies | Abc |
| | Technology | Abc |
| South | Furniture | Abc |
| | Office Supplies | Abc |
| | Technology | Abc |
| West | Furniture | Abc |
| | Office Supplies | Abc |
| | Technology | Abc |

Figure 11C

UTILIZING APPROPRIATE MEASURE AGGREGATION FOR GENERATING DATA VISUALIZATIONS OF MULTI-FACT DATASETS

RELATED APPLICATIONS

This application is a continuation of U.S. patent application Ser. No. 16/570,969, filed Sep. 13, 2019, titled "Utilizing Appropriate Measure Aggregation for Generating Data Visualizations of Multi-fact Datasets," which is a continuation-in-part of U.S. patent application Ser. No. 16/236,611, filed Dec. 30, 2018, titled "Generating Data Visualizations According to an Object Model of Selected Data Sources," which claims priority to U.S. Provisional Patent Application No. 62/748,968, filed Oct. 22, 2018, entitled "Using an Object Model of Heterogeneous Data to Facilitate Building Data Visualizations," each of which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 15/911,026, filed Mar. 2, 2018, entitled "Using an Object Model of Heterogeneous Data to Facilitate Building Data Visualizations," which claims priority to U.S. Provisional Patent Application 62/569,976, filed Oct. 9, 2017, entitled "Using an Object Model of Heterogeneous Data to Facilitate Building Data Visualizations," each of which is incorporated by reference herein in its entirety.

This application is also related to U.S. patent application Ser. No. 14/801,750, filed Jul. 16, 2015, entitled "Systems and Methods for using Multiple Aggregation Levels in a Single Data Visualization," and U.S. patent application Ser. No. 15/497,130, filed Apr. 25, 2017, entitled "Blending and Visualizing Data from Multiple Data Sources," which is a continuation of U.S. patent application Ser. No. 14/054,803, filed Oct. 15, 2013, entitled "Blending and Visualizing Data from Multiple Data Sources," now U.S. Pat. No. 9,633,076, which claims priority to U.S. Provisional Patent Application No. 61/714,181, filed Oct. 15, 2012, entitled "Blending and Visualizing Data from Multiple Data Sources," each of which is incorporated by reference herein in its entirety.

TECHNICAL FIELD

The disclosed implementations relate generally to data visualization and more specifically to interactive visual analysis of a data set using an object model of the data set.

BACKGROUND

Data visualization applications enable a user to understand a data set visually, including distribution, trends, outliers, and other factors that are important to making business decisions. Some data elements are computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations.

Some data visualization applications provide a user interface that enables users to build visualizations from a data source by selecting data fields and placing them into specific user interface regions to indirectly define a data visualization. See, for example, U.S. patent application Ser. No. 10/453,834, filed Jun. 2, 2003, entitled "Computer Systems and Methods for the Query and Visualization of Multidimensional Databases," now U.S. Pat. No. 7,089,266, which is incorporated by reference herein in its entirety. However, when there are complex data sources and/or multiple data sources, it may be unclear what type of data visualization to generate (if any) based on a user's selections.

In addition, some systems construct queries that yield data visualizations that are not what a user expects. In some cases, some rows of data are omitted (e.g., when there is no corresponding data in one of the fact tables). In some cases, numeric aggregated fields produce totals that are overstated because the same data value is being counted multiple times. These problems can be particularly problematic because an end user may not be aware of the problem and/or not know what is causing the problem.

SUMMARY

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once an object model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

In accordance with some implementations, a method generates data visualizations. The method is performed at a computer having one or more processors and memory. The memory stores one or more programs configured for execution by the one or more processors. The computer receives a visual specification, which specifies a data source, a plurality of visual variables, and a plurality of data fields from the data source. Each of the visual variables is associated with either (i) a respective one or more of the data fields or (ii) one or more filters, and each of the data fields is identified as either a dimension or a measure. The computer obtains a data model (or object model) encoding the data source as a tree of logical tables. Each logical table has its own physical representation and includes a respective one or more logical fields. Each logical field corresponds to either a data field or a calculation that spans one or more logical tables. Each edge of the tree connects two logical tables that are related. The computer generates a dimension subquery based on logical tables that supply the data fields for the dimensions and the filters. The computer also generates, for each measure, based on the logical tables that supply the data fields for the respective measure and the filters, an aggregated measure subquery grouped by the dimensions. The computer forms a final query by joining, using the dimensions, the dimension subquery to each of the aggregated measure subqueries. The computer subsequently executes the final query against the data source to retrieve tuples that comprise distinct ordered combinations of data values for the data fields. The computer then builds and displays a data visualization according to the data fields in the tuples and according to the visual variables to which each of the data fields is associated.

In some implementations, the computer generates each aggregated measure subquery by performing a sequence of operations. The computer computes a measure sub-tree of the tree of logical tables. The measure sub-tree is a minimum sub-tree required to supply the data fields for a respective measure. The computer also computes a dimension-filter sub-tree of the tree of logical tables. The dimension-filter sub-tree is a minimum sub-tree required to supply all of the physical inputs for the dimensions and the filters. When the dimension-filter sub-tree does not share any logical table with the measure sub-tree, the computer adds a neighboring logical table from the measure sub-tree to the dimension-filter sub-tree. The computer compiles the measure sub-tree to obtain a measure join tree and compiles the dimension-filter sub-tree to obtain a dimension-filter join tree. The computer layers calculations and filters over the measure join tree and the dimension-filter join tree to obtain an updated measure sub-tree and an updated dimension-filter sub-tree, respectively. The computer de-duplicates the updated dimension-filter sub-tree by applying a group-by operation that uses the dimensions and linking fields, which include (i) keys from relationships between the logical tables and (ii) data fields of calculations shared with the measure sub-tree, to obtain a de-duplicated dimension-filter sub-tree. The computer combines the de-duplicated dimension-filter sub-tree with the updated measure sub-tree to obtain the aggregated measure subquery.

In some implementations, the computer compiles the measure sub-tree by inner joining logical tables in the measure sub-tree to obtain the measure join tree.

In some implementations, the computer computes the dimension-filter sub-tree by performing a sequence of operations. The computer inner joins logical tables in the dimension-filter sub-tree that are shared with the measure sub-tree, and left-joins (also referred to as left outer joins) logical tables in the dimension-filter sub-tree that are not shared with the measure sub-tree, to obtain the dimension-filter join tree.

In some implementations, the computer combines the de-duplicated dimension-filter sub-tree with the updated measure sub-tree by performing a sequence of operations. The computer determines if the de-duplicated dimension-filter sub-tree contains a filter. When the de-duplicated dimension-filter sub-tree contains a filter, the computer inner-joins the updated measure-sub-tree with the de-duplicated dimension-filter sub-tree. When the de-duplicated dimension-filter sub-tree does not contain a filter, the computer left outer-joins the updated measure-sub-tree with the de-duplicated dimension-filter sub-tree.

In some implementations, the computer determines if the keys indicate a many-to-one relationship or a one-to-one relationship between a first logical table and a second logical table. When the keys indicate a many-to-one relationship between the first logical table and the second logical table, the computer includes the first table and the second table in the measure sub-tree, thereby avoiding the group-by in the de-duplication operation for the first logical table and the second logical table.

In some implementations, when the dimension-filter sub-tree joins against the measure sub-tree exclusively along many-to-one and one-to-one links, the computer replaces tables shared by the measure sub-tree and the dimension-filter sub-tree with the de-duplicated dimension-filter sub-tree.

In some implementations, the computer generates the dimension subquery by inner-joining a first one or more logical tables in the tree of logical tables. Each logical table of the first one or more logical tables supplies the data fields for a dimension and/or a filter.

In some implementations, the computer forms the final query by joining the dimensions subquery and the aggregated measure subqueries on the dimensions using outer joins, and applying a COALESCE after each outer join.

In some implementations, when the visualization has no dimensions, the computer performs a full join between the aggregated measure subqueries to form the final query.

In accordance with some implementations, a system for generating data visualizations includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 1 illustrates conceptually a process of building a data visualization in accordance with some implementations.

FIGS. 11C-11F illustrate data visualizations, in accordance with some implementations.

Like reference numerals refer to corresponding parts throughout the drawings.

Figure 2:
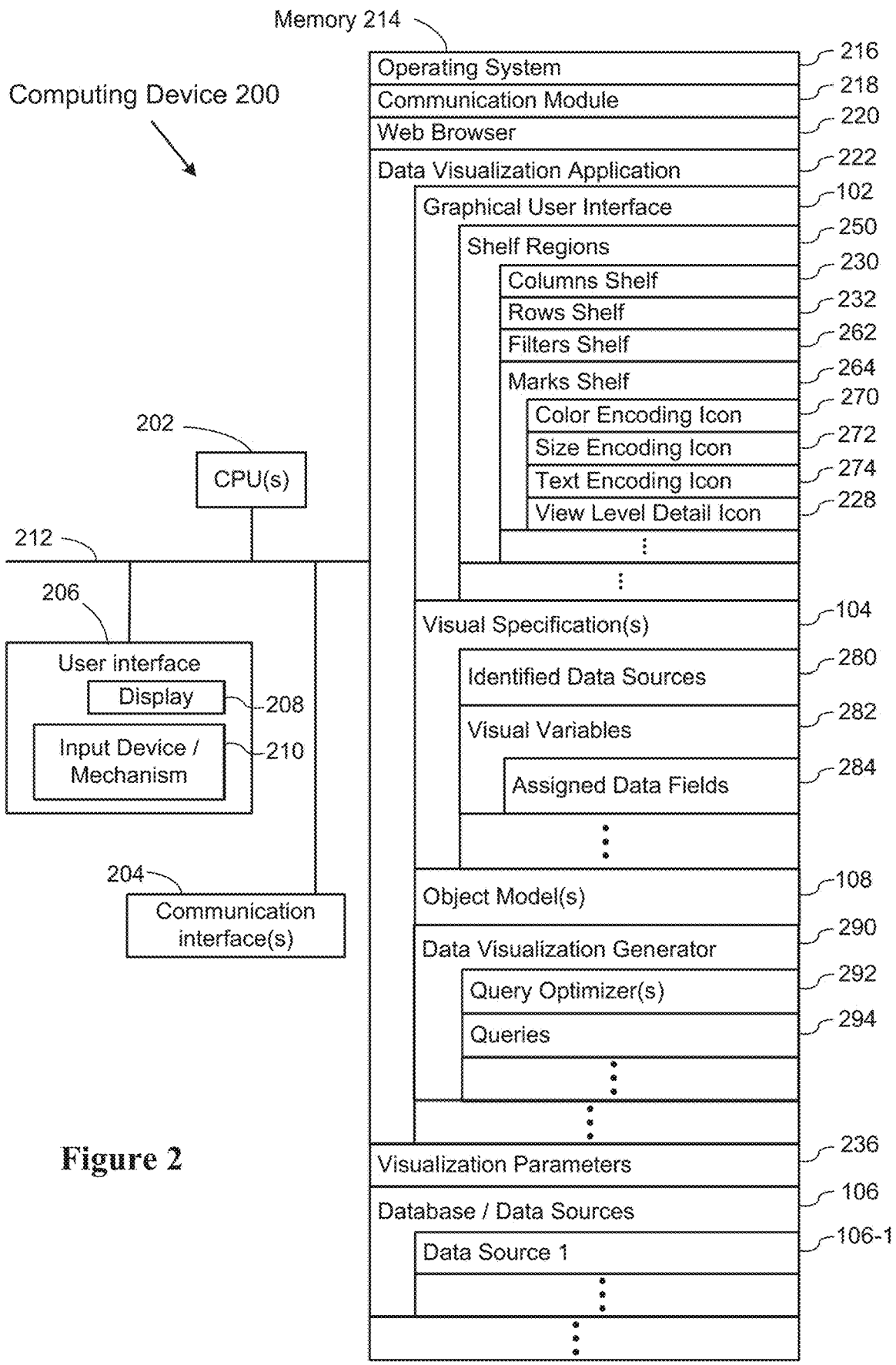
FIG. 2 is a block diagram of a computing device according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Some implementations of an interactive data visualization application use a data visualization user interface 102 to build a visual specification 104, as shown in FIG. 1. The visual specification identifies one or more data source 106, which may be stored locally (e.g., on the same device that is displaying the user interface 102) or may be stored externally (e.g., on a database server or in the cloud). The visual specification 104 also includes visual variables. The visual variables specify characteristics of the desired data visualization indirectly according to selected data fields from the data sources 106. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 (sometimes called a data model) to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. In the illustrations below, the many-to-one relationships are illustrated with arrows, with the "many" side of each relationship vertically lower than the "one" side of the relationship. The object model also identifies each of the data fields (attributes) as either a dimension or a measure. In the following, the letter "D" (or "d") is used to represent a dimension, whereas the latter "M" (or "m") is used to represent a measure. When an object model 108 is constructed, it can facilitate building data visualizations based on the data fields a user selects. Because a single object model can be used by an unlimited number of other people, building the object model for a data source is commonly delegated to a person who is a relative expert on the data source, As a user adds data fields to the visual specification (e.g., indirectly by using the graphical user interface to place data fields onto shelves), the data visualization application 222 (or web application 322) groups (110) together the user-selected data fields according to the object model 108. Such groups are called data field sets. In many cases, all of the user-selected data fields are in a single data field set. In some instances, there are two or more data field sets. Each measure m is in exactly one data field set, but each dimension d may be in more than one data field set.

The data visualization application 222 (or web application 322) queries (112) the data sources 106 for the first data field set, and then generates a first data visualization 122 corresponding to the retrieved data. The first data visualization 122 is constructed according to the visual variables 282 in the visual specification 104 that have assigned data fields 284 from the first data field set. When there is only one data field set, all of the information in the visual specification 104 is used to build the first data visualization 122. When there are two or more data field sets, the first data visualization 122 is based on a first visual sub-specification consisting of all information relevant to the first data field set. For example, suppose the original visual specification 104 includes a filter that uses a data field f. If the field f is included in the first data field set, the filter is part of the first visual sub-specification, and thus used to generate the first data visualization 122.

When there is a second (or subsequent) data field set, the data visualization application 222 (or web application 322) queries (114) the data sources 106 for the second (or subsequent) data field set, and then generates the second (or subsequent) data visualization 124 corresponding to the retrieved data. This data visualization 124 is constructed according to the visual variables 282 in the visual specification 104 that have assigned data fields 284 from the second (or subsequent) data field set.

FIG. 2 is a block diagram illustrating a computing device 200 that can execute the data visualization application 222 or the data visualization web application 322 to display a data visualization 122. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

Figure 4:
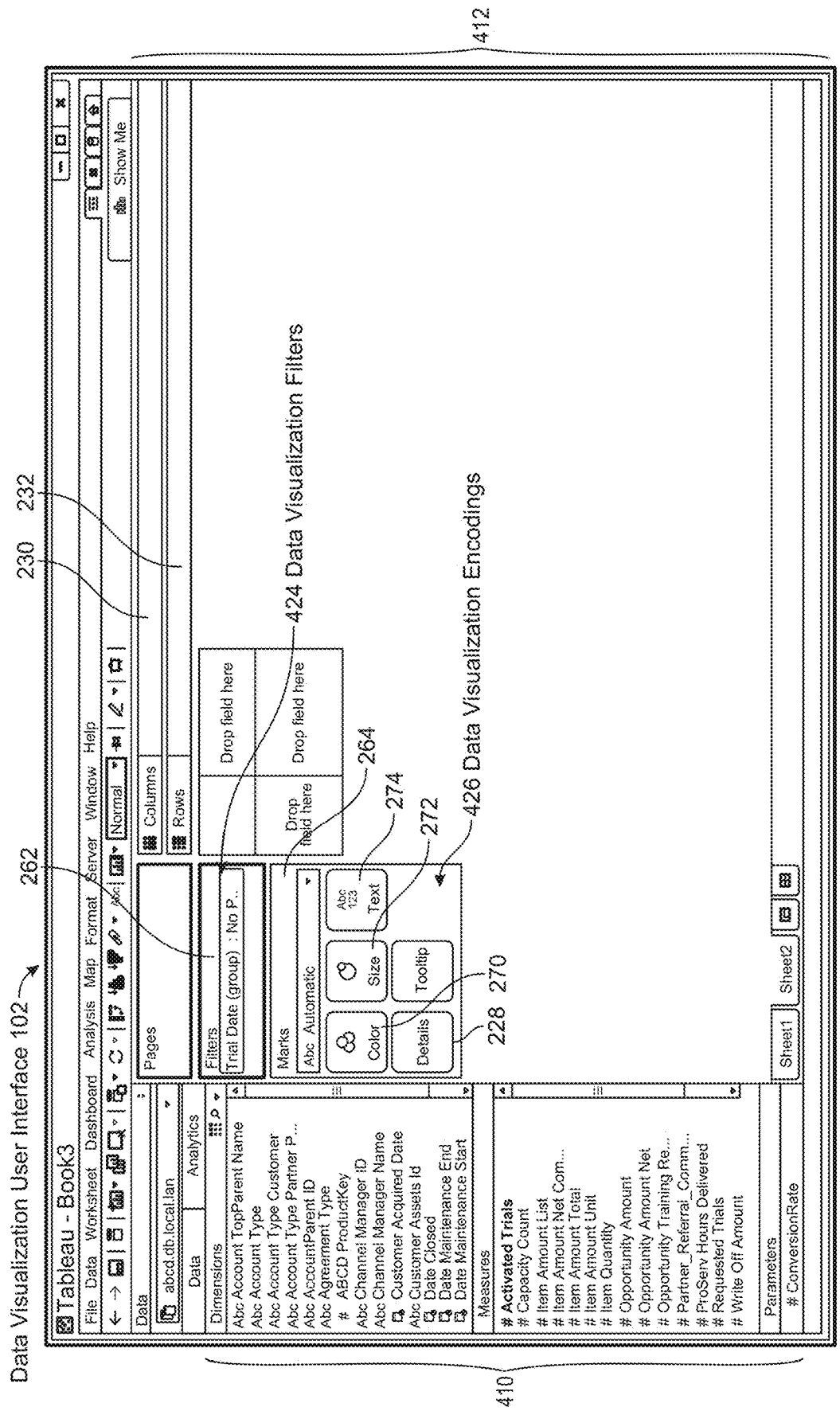
FIG. 4 provides an example data visualization user interface according to some implementations.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which enables a user to build a data visualization by specifying elements visually, as illustrated in FIG. 4 below;
- in some implementations, the user interface 102 includes a plurality of shelf regions 250, which are used to specify characteristics of a desired data visualization. In some implementations, the shelf regions 250 include a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks). In some implementations, the shelf regions 250 include a filters shelf 262, which enables a user to limit the data viewed according to a selected data field (e.g., limit the data to rows for which a certain field has a specific value or has values in a specific range). In some implementations, the shelf regions 250 include a marks shelf 264, which is used to specify various encodings of data marks. In some implementations, the marks shelf 264 includes a color encoding icon 270 (to specify colors of data marks based on a data field), a size encoding icon 272 (to specify the size of data marks based on a data field), a text encoding icon (to specify labels associated with data marks), and a view level detail icon 228 (to specify or modify the level of detail for the data visualization);
- visual specifications 104, which are used to define characteristics of a desired data visualization. In some implementations, a visual specification 104 is built using the user interface 102. A visual specification includes identified data sources 280 (i.e., specifies what the data sources are), which provide enough information to find the data sources 106 (e.g., a data source name or network full path name). A visual specification 104 also includes visual variables 282, and the assigned data fields 284 for each of the visual variables. In some implementations, a visual specification has visual variables corresponding to each of the shelf regions 250. In some implementations, the visual variables include other information as well, such as context information about the computing device 200, user preference information, or other data visualization features that are not implemented as shelf regions (e.g., analytic features);
- one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;
- a data visualization generator 290, which generates and displays data visualizations according to visual specifications. In accordance with some implementations, the data visualization generator 290 uses an object model 108 to generate queries 294 (e.g., dimension subqueries, aggregated measure subqueries, and/or final queries) and/or optimize queries using query optimizers 292. The details of the query generation and optimization techniques are described below in reference to FIGS. 5A-11, according to some implementations.

visualization parameters 236, which contain information used by the data visualization application 222 other than the information provided by the visual specifications 104 and the data sources 106; and zero or more databases or data sources 106 (e.g., a first data source 106-1), which are used by the data visualization application 222. In some implementations, the data sources can be stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
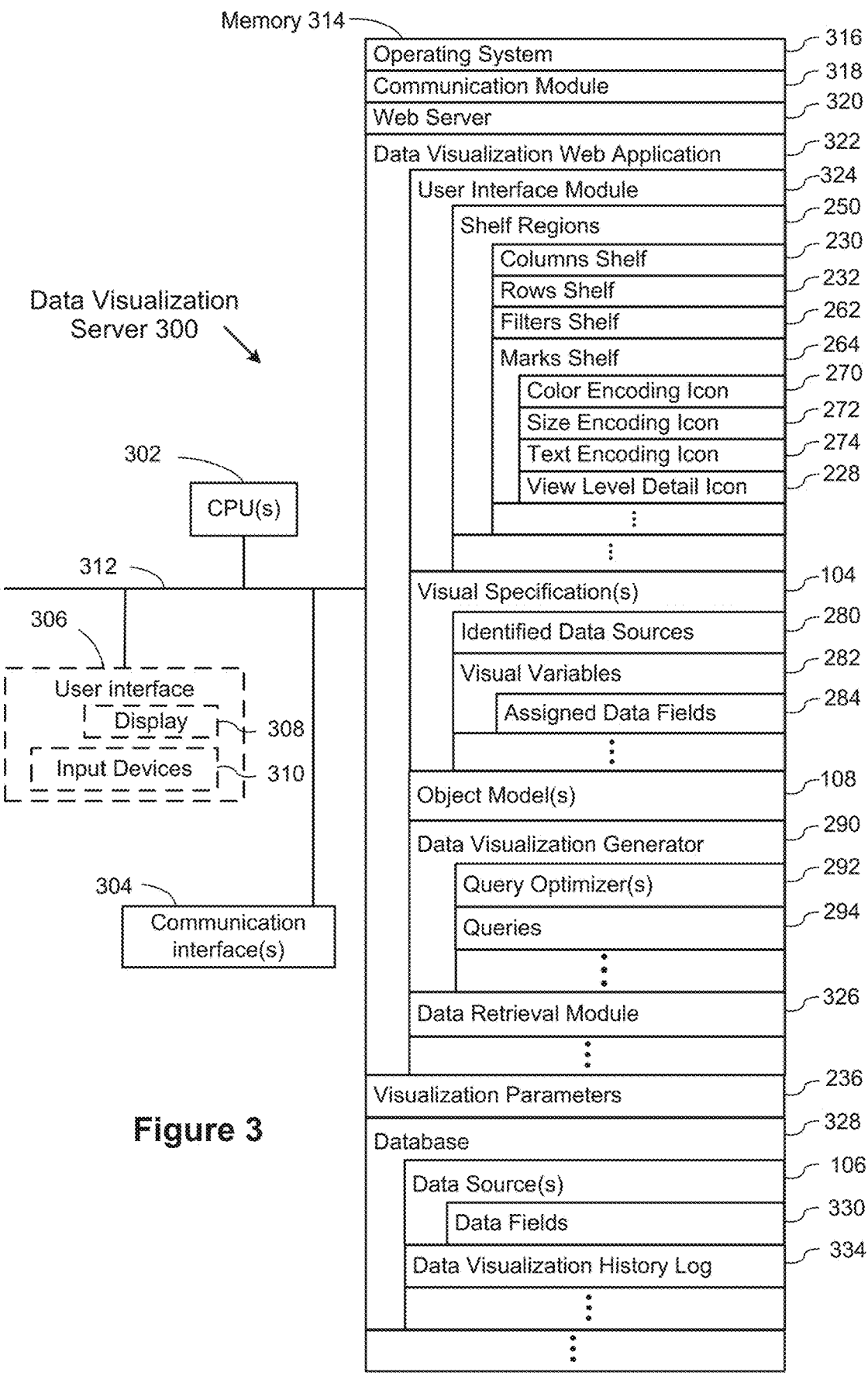
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the user interface module 324 specifies shelf regions 250, as described above for a computing device 200;

the data visualization web application also stores visual specifications 104 as a user selects characteristics of the desired data visualization. Visual specifications 104, and the data they store, are described above for a computing device 200;

one or more object models 108, as described above for a computing device 200;

a data visualization generator 290, which generates and displays data visualizations according to user-selected data sources and data fields, as well as one or more object models 108, which describe the data sources 106. The operation of the data visualization generator is described above with respect to a computing device 200;

in some implementations, the web application 322 includes a data retrieval module 326, which builds and executes queries to retrieve data from one or more data sources 106. The data sources 106 may be stored locally on the server 300 or stored in an external database 328. In some implementations, data from two or more data sources may be blended. In some implementations, the data retrieval module 326 uses a visual specification 104 to build the queries, as described above for the computing device 200 in FIG. 2;

in some implementations, the memory stores visualization parameters 236, as described above for the computing device 200; and one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences. In some implementations, the database 328 includes a data visualization history log 334. In some implementations, the history log 334 tracks each time the data visualization renders a data visualization.

The databases 328 may store data in many different formats, and commonly includes many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIG. 4 shows a data visualization user interface 102 in accordance with some implementations. The user interface 102 includes a schema information region 410, which is also referred to as a data pane. The schema information region 410 provides named data elements (e.g., field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions 250, such as a columns shelf region 230 and a rows shelf region 232. These are also referred to as the column shelf 230 and the row shelf 232. In addition, this user interface 102 includes a filters shelf 262, which may include one or more filters 424.

As illustrated here, the data visualization region 412 also has a large space for displaying a visual graphic. Because no data elements have been selected yet in this illustration, the space initially has no visual graphic.

A user selects one or more data sources 106 (which may be stored on the computing device 200 or stored remotely), selects data fields from the data source(s), and uses the selected fields to define a visual graphic. The data visualization application 222 (or web application 322) displays the generated graphic 122 in the data visualization region 412. In some implementations, the information the user provides is stored as a visual specification 104.

In some implementations, the data visualization region 412 includes a marks shelf 264. The marks shelf 264 allows a user to specify various encodings 426 of data marks. In some implementations, the marks shelf includes a color encoding icon 270, a size encoding icon 272, a text encoding icon 274, and/or a view level detail icon 228, which can be used to specify or modify the level of detail for the data visualization.

In some implementations, data visualization platforms enable users to build visualizations through drag and drop actions using a single logical table, even when the data comes from multiple physical tables. The logical table can be constructed by physical modeling, which can include pivots, joins, and unions. Tables combined through physical modeling represent logical tables themselves. In some data visualization platforms, such as Tableau, a query generation model automatically maps user actions to underlying queries of data from the physical tables.

Figure 5A:
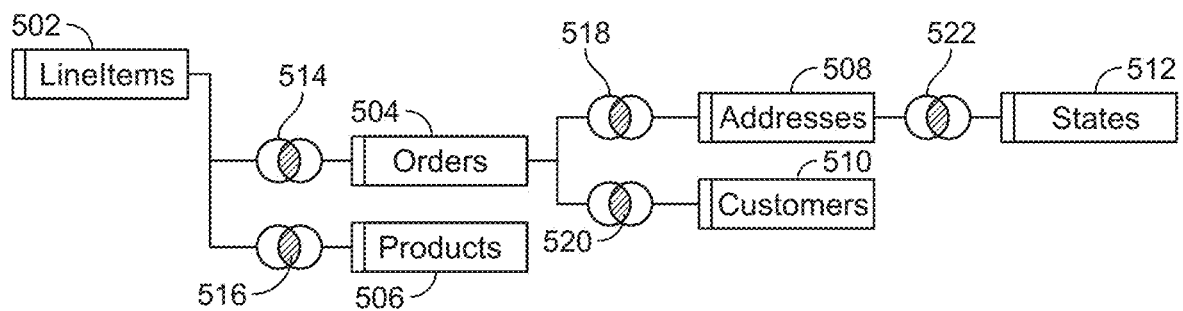
FIG. 5A illustrates an example data model (or object model), in accordance with some implementations.

In some implementations, an analyst creates an object model, an example of which is shown in FIG. 5A, which has six logical tables. For the example in FIG. 5A, each table has its own measure granularity, which is better modeled as a logical table, regardless of the actual physical storage of the data. The example object model includes a Line Items table 502 that has a join 514 to an Orders table 504 and another join 516 to a Products table 506. The example also shows the Orders table 504 having a join 518 to an Addresses table 508 and another join 520 to a Customers table 510. The Addresses table 508 has a join 522 to a States table 512.

Figure 5B:
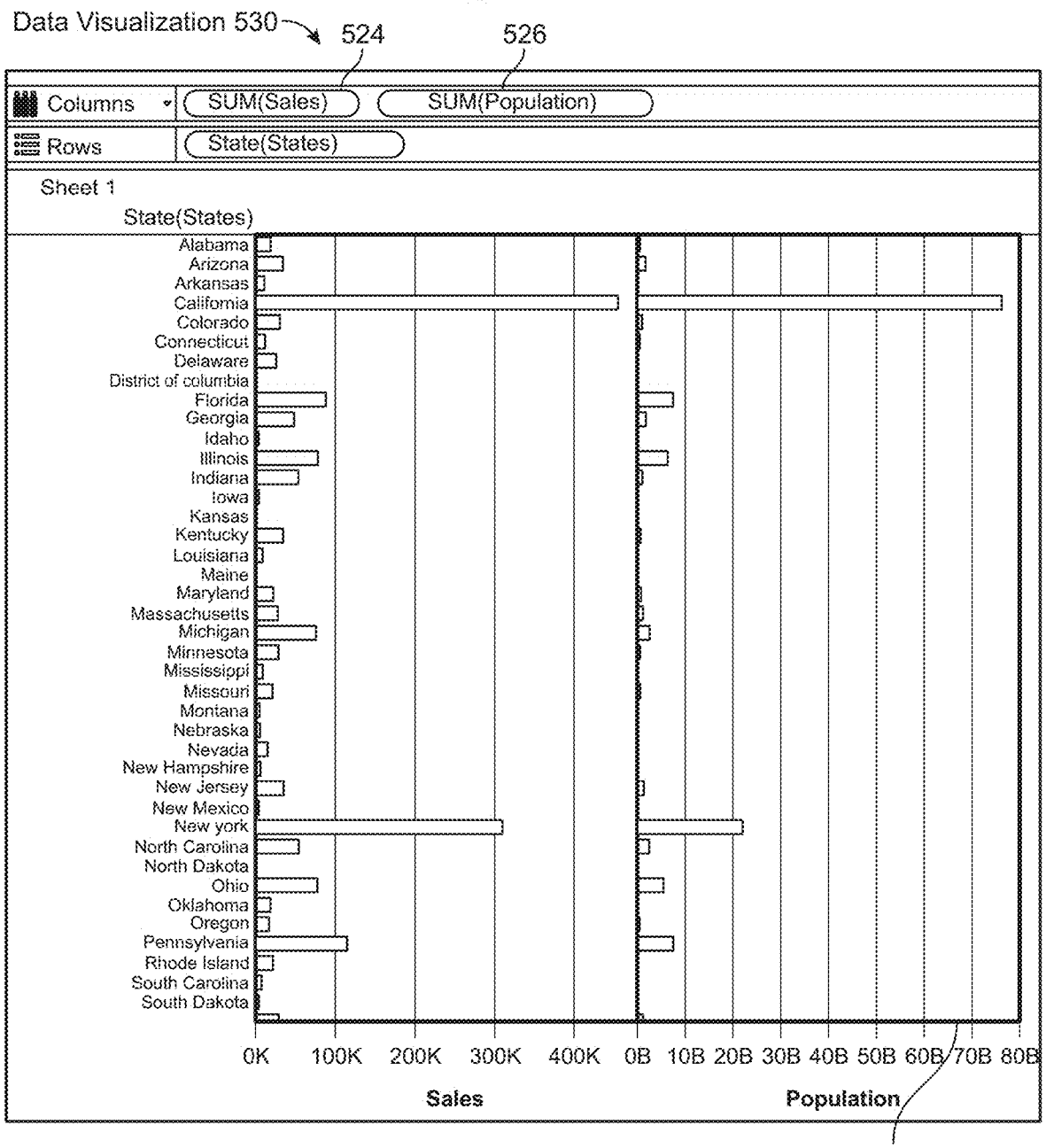
FIG. 5B illustrates a data visualization, in accordance with some implementations.

Suppose a user creates the visualization 530 shown in FIG. 5B. In this case, Sales 524 is a measure from the Line Items table 502 and Population 526 is a measure from the States table 512. While it is possible to derive the correct result for Sales, the data visualization has overstated measure values for Population. For this example, the population is indicated as billions of people 528 for some states. The reason for this duplication is that the data visualization framework queried all the tables joined together. The granularity of this join tree is that of Line Items 502. In other words, each row represents a line item and will contain a column containing the population of the state in which the line item occurred. Thus, SUM(Population) will yield the state's population multiplied by the number of line items for that state. This problem occurs because the six conceptually logical tables were treated as a single logical table.

Figure 5C:
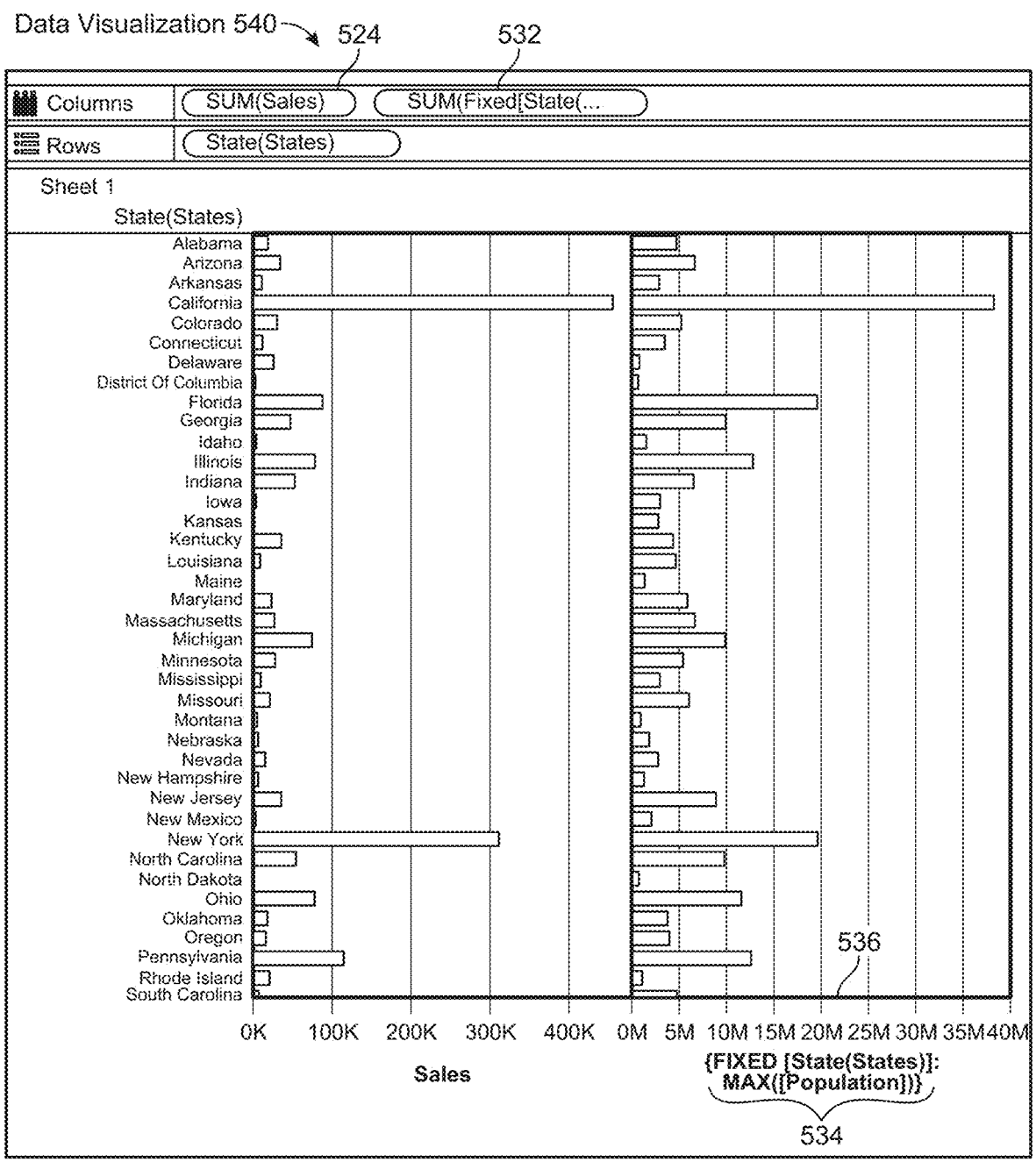
FIG. 5C illustrates a data visualization, in accordance with some implementations.

One solution to fix the measure duplication is to use Level of Detail calculations. For instance, the calculation {Fixed [State (States)]: MIN([Population])} can be rewritten to get Population aggregated to its native granularity. FIG. 5C illustrates a data visualization 540 after using the Level of Detail calculations 532, in accordance with some implementations. As shown, the population is correctly displayed in millions 536 (instead of in billions as incorrectly displayed in FIG. 5B). A key downside to this approach, however, is that it requires the analyst to become aware of the duplication as well as understand the semantics of these calculations. In addition, the default axis label 534 is a complex pression rather than "Population." Disclosed implementations provide an alternative solution that is performed by the data visualization application automatically.

To overcome at least some of these problems, some implementations include a method for mapping drag and drop actions to more granular logical models. Instead of a single logical table, some implementations operate over a tree of logical tables where each node is a logical table (with its own physical representation), and each edge is a link between two tables.

Some implementations handle situations where primary keys for one or more logical tables are unknown or cannot be ascertained (without more complex analysis). In other words, the primary keys for the logical tables are missing. Primary keys are a powerful tool for recovering a table's granularity.

Some implementations handle multiple relationship cardinalities between logical tables. Relationships may be many-to-one, one-to-one, or many-to-many. Some implementations treat unknown relationship types as many-to-many. Some implementations use relationship information to recover primary keys. For instance, the fields in the "one" side of a relation contain the primary key.

In the following description, logical fields refer to either data fields that arise from underlying representations inside logical tables (e.g., fields from the physical database tables backing a logical table), or calculations with inputs that span logical tables.

Figure 6A:
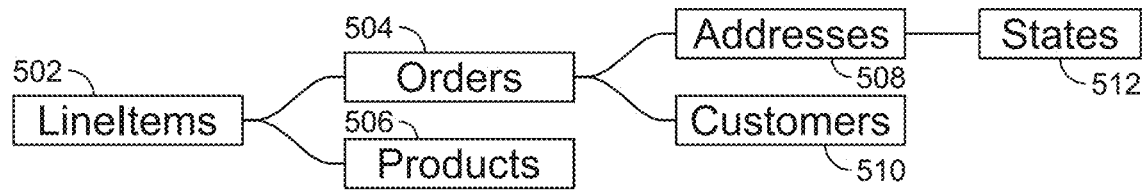
FIG. 6A illustrates an example data model or object model, in accordance with some implementations.

FIG. 6A illustrates an object model as a logical tree, according to some implementations. As indicated by the numerals, the tables correspond to the tables in the example shown in FIG. 5A. Each logical table has a many-to-one relationship with its neighbor on the right. Sometimes, the relationships have unknown cardinalities.

Figure 6B:
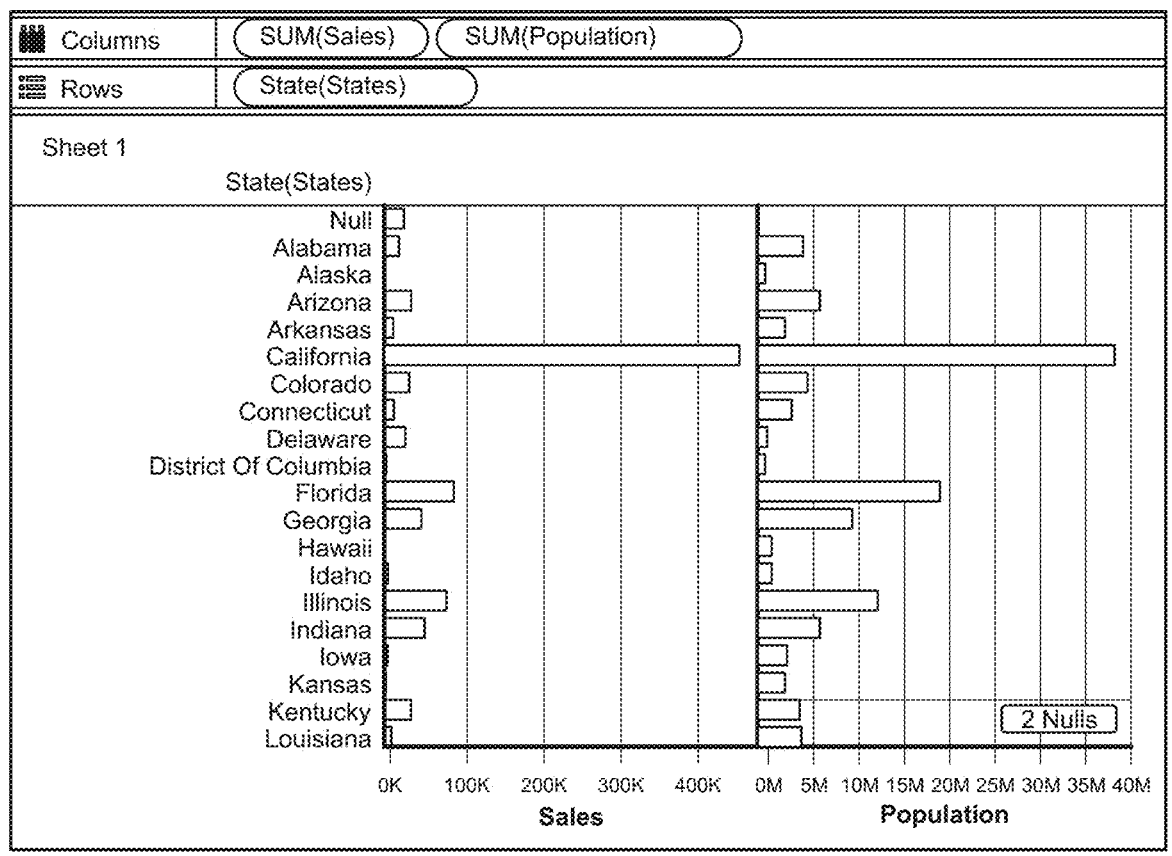
FIG. 6B illustrates a data visualization, in accordance with some implementations.

Some implementations map user actions to visualizations with proper measure aggregation. Some implementations leverage the logical tree structure to generate a visualization (an example of which is shown in FIG. 6B) with measures aggregated at their native granularities. Thus, for the example described above in reference to FIG. 5A, an analyst can obtain the proper Population values without having to add new calculations.

Some implementations calculate full domain values. To illustrate, suppose the full set of states is contained within the States table 512. For the visualization in FIG. 6B, not all states may have had sales. As a result, if all the tables are joined together using an inner join, a visualization framework can drop states without sales (e.g., Alaska and Hawaii). One solution is to use a partial or full outer join to keep all the states. Some implementations generate a visualization that contains the full domain by first querying the logical tables that are necessary to compute the dimension values.

Some implementations ensure measure values are represented or preserved even as new dimensions are added. For instance, due to a missing or malformed foreign key, a sale may not have a state. If the tables were inner joined together, the sales values would get dropped. Some implementations avoid this problem by querying the tables needed to get the full measure values and using left joins to ensure that missing dimensions do not cause measures to get dropped. For the example above, Sales without states are encoded by the "Null" state.

Some implementations query fewer tables than would be necessary with solutions that do not use the tree of logical tables. For the example above, alternate frameworks would have queried a join tree of all six tables shown in FIG. 6A. With the techniques disclosed herein, a data visualization framework can recognize that only the Line Items table 502, the Orders table 504, the Addresses table 508, and the States tables 512 have to be queried, since these are the logical tables that contain the dimension and measure values or are along the join paths for these tables.

Some implementations leverage or incorporate primary key and cardinality information when such information is available, although the techniques yield correct results even in the worst case (e.g., when all the links or relationships between the logical tables are many-to-many, or when there are no known primary keys for the logical tables). Some implementations incorporate such information to generate simpler queries.

Some implementations map a description of a visualization to a high-level query representation that includes dimensions, measures, and filters. Traditional implementations assume a single logical table while converting this representation into a lower-level query representation. The techniques described herein, on the other hand, generate queries that encode the semantics of a tree of logical tables. Some implementations generate a subquery that contains the dimensions and a subquery for each aggregated measure (grouped by the dimensions). Some implementations join these subqueries together on the dimensions, as further described below.

Generating Subqueries

To generate a dimension subquery, some implementations join all the logical tables that contain a dimension field, or join these tables together, and group by the set dimensions. When generating the measure subquery, some implementations generate a flat table at the granularity of the measure that contains the measure's input fields (in the case of a logical measure) and the dimensions. Some implementations apply the aggregate with a group by on the dimensions. In the following discussions, a non-logical field (i.e., a non-calculated field) is sometimes called a physical field, and logical tables are sometimes called tables.

For each measure, some implementations generate the flat table at the measure's granularity using an algorithm. The algorithm includes collecting the physical input fields for the dimensions, the measure, and the filters. The algorithm also includes computing a minimum sub-tree (called the physical sub-tree) needed for all the physical input fields. The algorithm further includes computing another minimum subtree (called the measure-sub-tree) needed to supply all the physical inputs for the measure.

The algorithm further includes partitioning the sub-tree into sub-tree components. The trees emanating from the measure subtree are called the dimension-filter subtrees. At this point, the measure and dimension-filter subtrees are disjoint. It is possible that logical fields or filters will span into or across the measure subtree. In that case, the algorithm includes creating a dimension-measure subtree that merges one or more dimension-filter subtrees with the minimum set of tables (e.g., neighboring tables) from the measure subtree.

The algorithm also includes assigning the logical fields and filters to the subtrees that contains all their inputs. The algorithm further includes layering the logical fields and filters on top of the join tree consisting of all the tables in the subtree joined together. Some implementations inner join tables that are in the measure subtree and left outer join the other tables along the paths emanating from the measure tables.

Some implementations de-duplicate each dimension (and, if applicable, the dimension/measure) subtree on the dimensions and using linking fields. The structure of the de-duplication step is a "Group By" on a set of fields and a MAX on the rest of the fields. Some implementations use a set of linking fields that include (i) physical fields (sometimes called physical input fields or data fields) from the measure tables needed to compute logical dimension fields and filters, and (ii) relationship fields that link this subtree against the measure subtree. Some implementations left outer join all the subtrees, starting from the measure subtree, together. If a dimension subtree has a filter, then some implementations add a constant calculation to the dimension subtree and add a filter on top of the join to determine that this calculation is not null.

Figure 7:
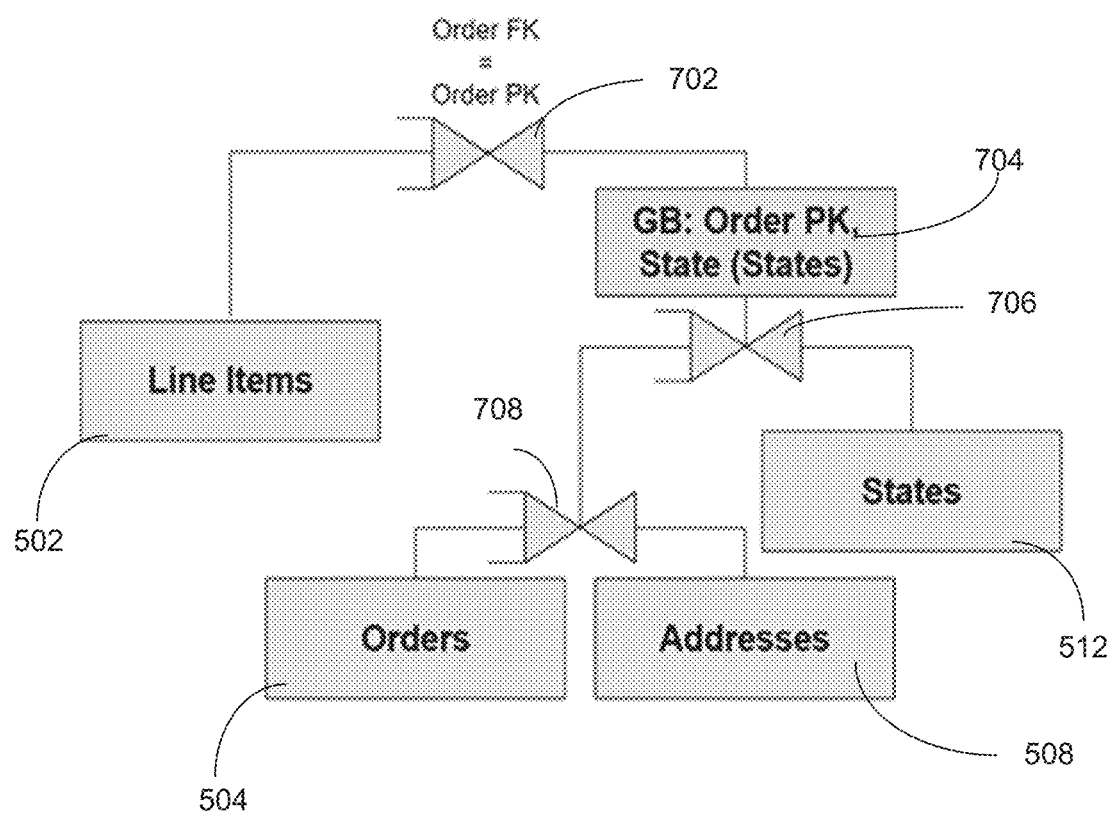
FIG. 7 illustrates an example query, in accordance with some implementations.

The following example illustrates an application of the algorithm described above, according to some implementations. For the visualization example discussed above in reference to FIGS. 5A-5C and 6A-6B, the pre-aggregate sub-query for States and Population is simply the States table 512. The query for State and Sales is shown in FIG. 7, in accordance with some implementations. The physical subtree consists of the Line Items table 502 (for the measure), the States table 512 (for the dimension), as well as the Orders table 504, and the Addresses table 508, since these tables are needed for supplying the physical input fields. For this example, the measure subtree is Line Items and there is a single dimension subtree that contains the other three tables. Some implementations group (704) the dimension subtree by the dimension (States) and the key (indicated as 'PK' for primary key) from the spanning relationship between the Line Items table 502 and the dimension subtree. In this case, the dimension subtree joins (702) via the link between the Line Items table 502 and the Orders table 504. Some implementations join the measure and dimension subtrees via this link. The joins 702, 706, and 708 are left outer joins, emanating from the measure subtree, to ensure that rows in the Line Items table with missing states are not lost.

Figure 8A:
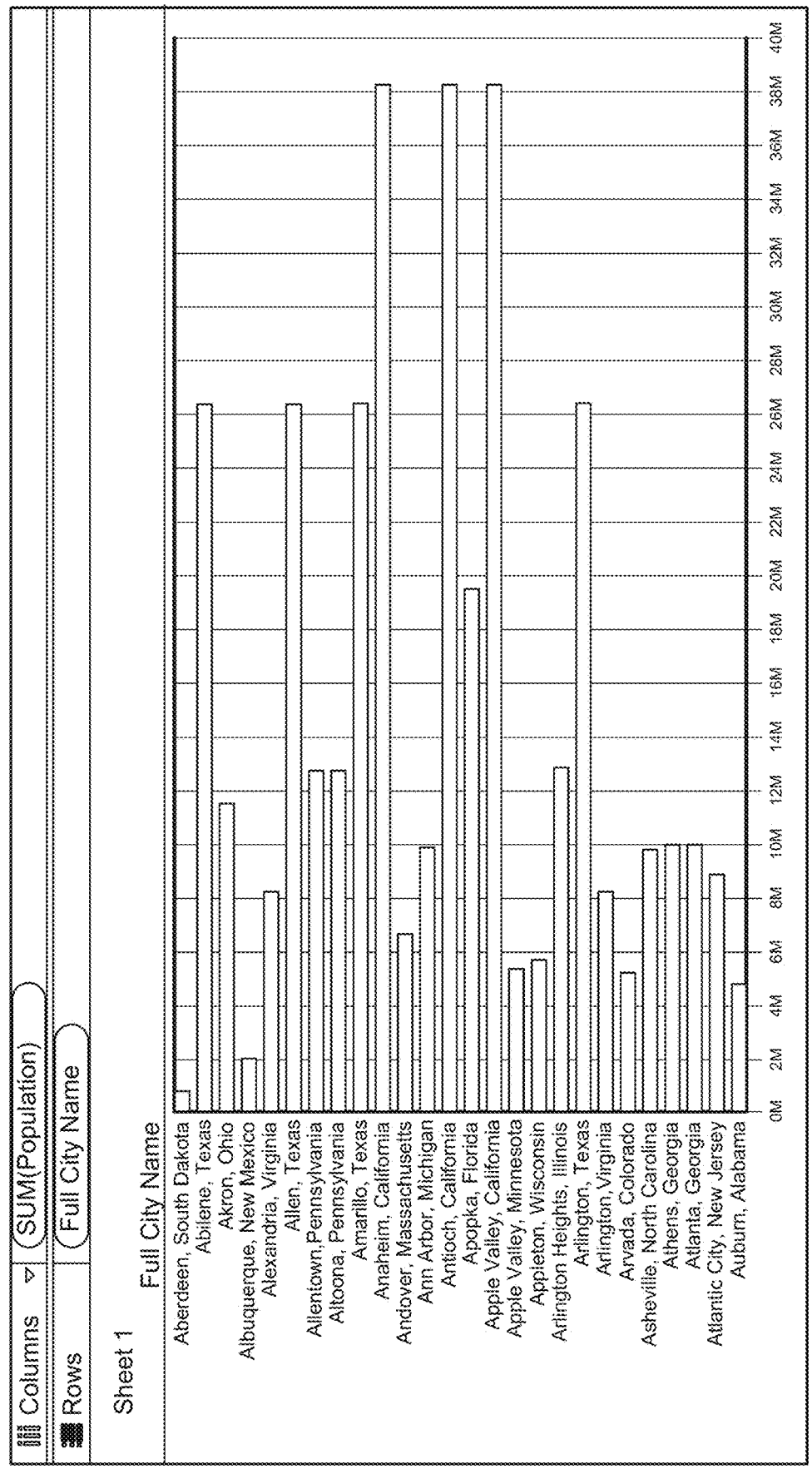
FIG. 8A illustrates a data visualization, in accordance with some implementations.
Figure 8B:
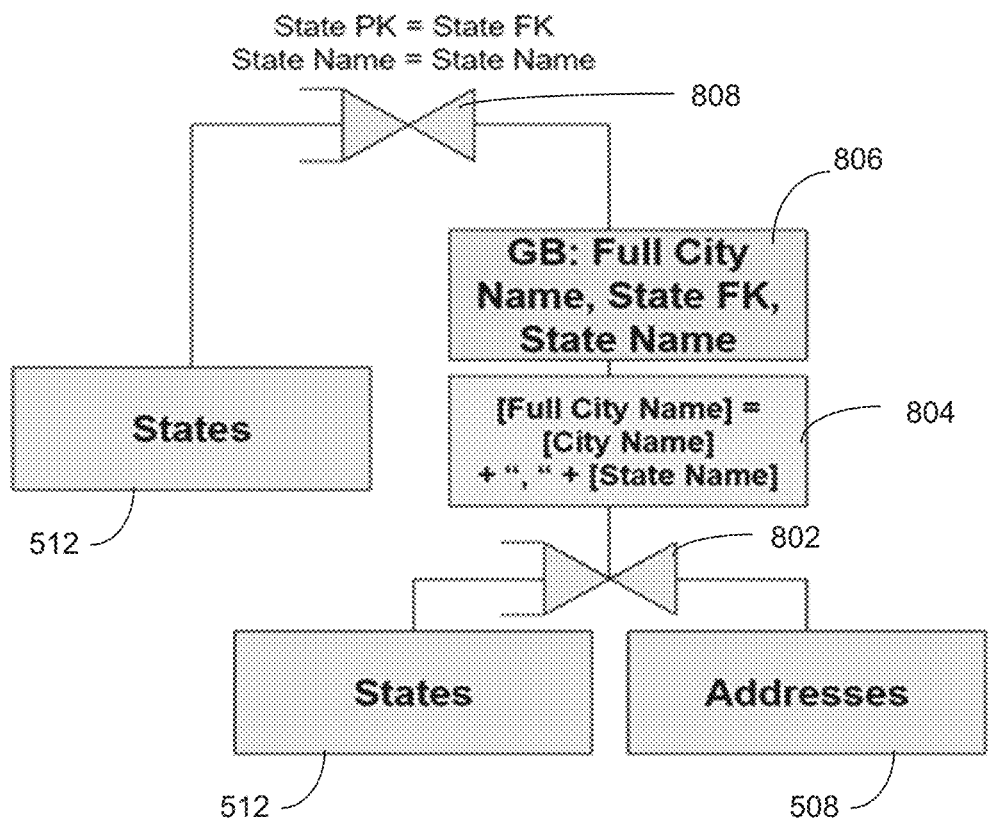
FIG. 8B illustrates an example query, in accordance with some implementations.

Referring next to FIGS. 8A and 8B, suppose a user created a calculation that spanned logical tables, such as [Full City Name]=[City Name]+","+[State Name], where [City Name] comes from the Addresses table 508 and [State Name] came from the States table 512. FIG. 8A illustrates a data visualization 800 in this scenario, in accordance with some implementations. The query for the visualization is shown in FIG. 8B, in accordance with some implementations. The physical join tree includes the States table 512 (for the measure and dimension) and the Addresses table 508 (for the dimension).

For this example, the measure subtree is States, and the dimension subtree includes a logical dimension field 804 that spans the Addresses table 508 and the States table 512. Thus, this example shown an instance of a dimension-measure subtree. Some implementations join (802) this subtree to the measure subtree using the relationships between the measure tables and rest of the tables in the dimension-measure subtree. Some implementations de-duplicate (806) the dimension-measure subtree using the dimension (Full City Name), the joining relationship (State foreign key (FK)), as well as the physical input of the dimension that falls in the measure part of the dimension-measure subtree (State Name). Subsequently, some implementations join (808) using the key from the relationship and the physical input field.

Figure 9A:
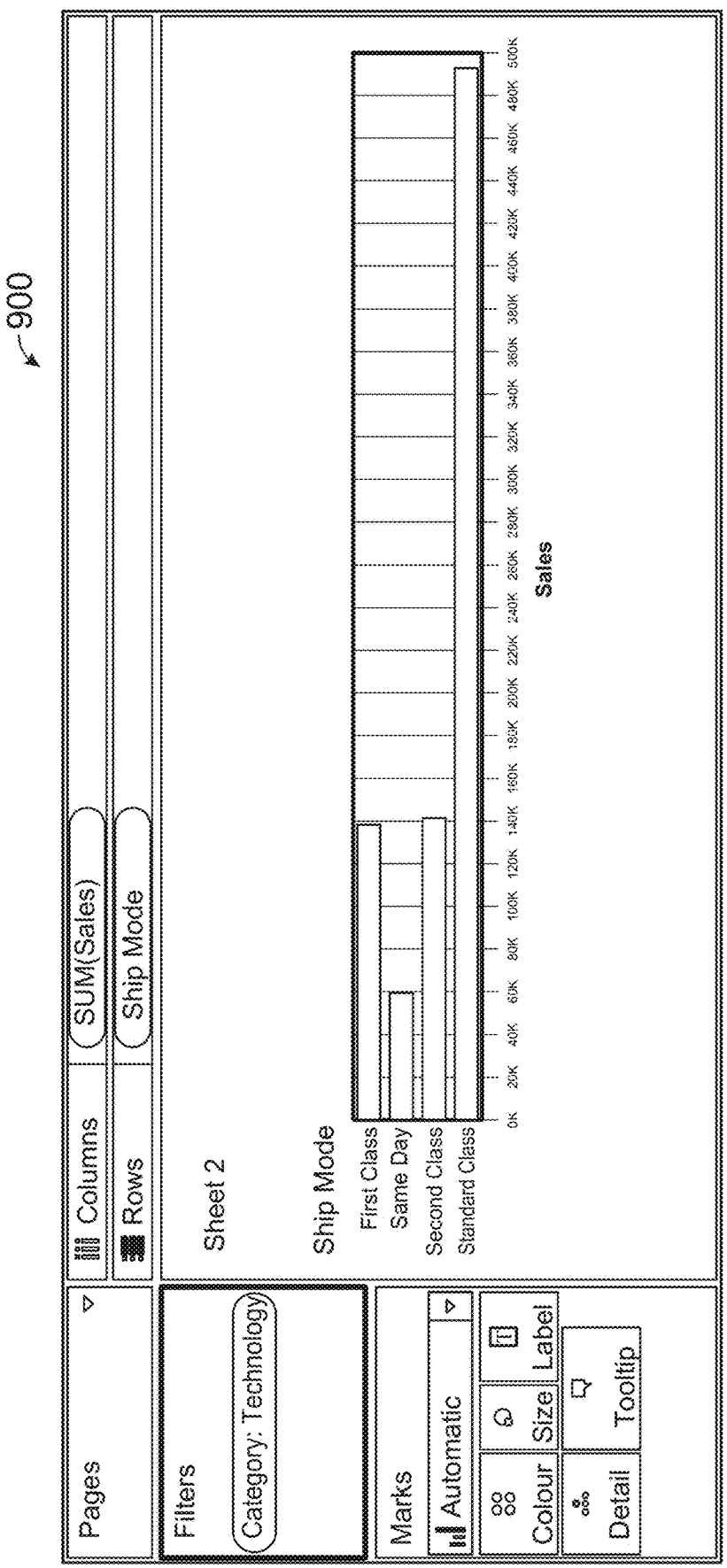
FIG. 9A illustrates a data visualization, in accordance with some implementations.
Figure 9B:
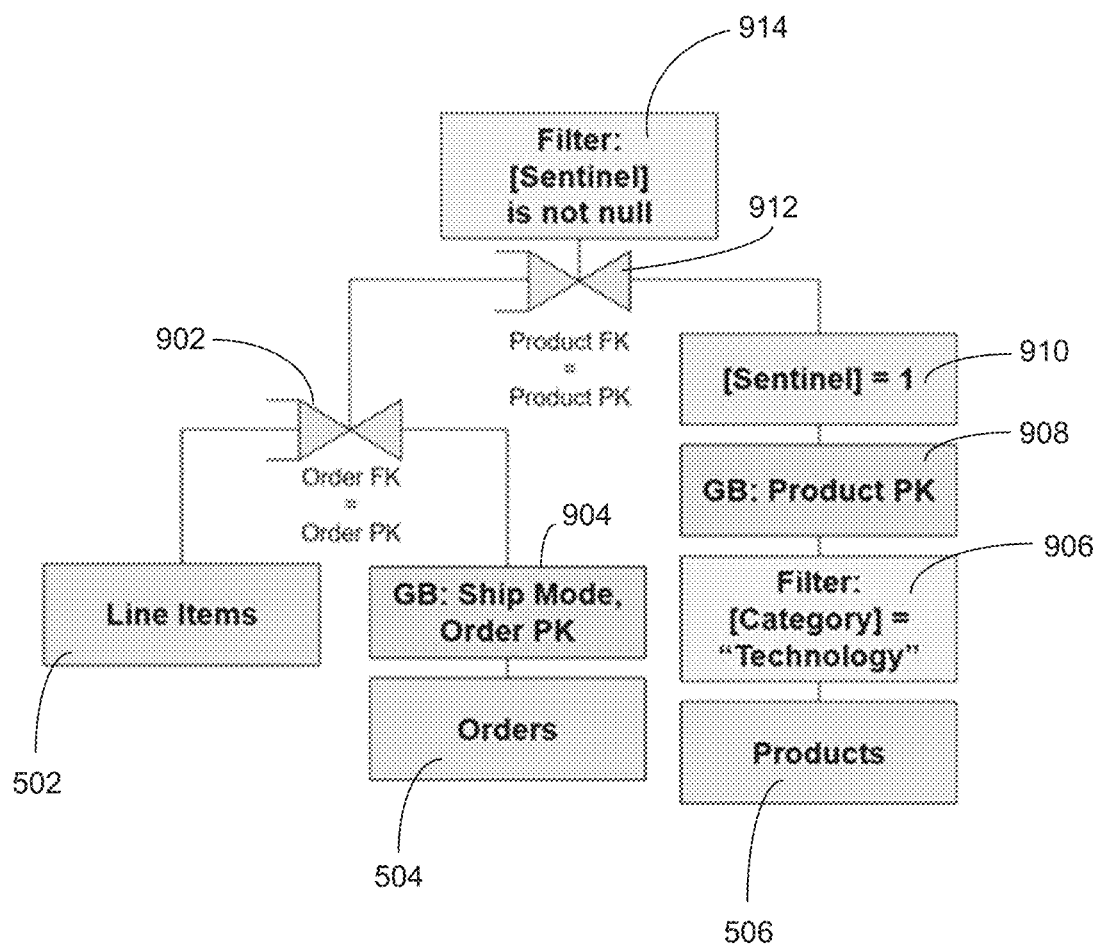
FIG. 9B illustrates an example query, in accordance with some implementations.

Referring next to FIGS. 9A and 9B, suppose a user wants to create a visualization 900 of sum of Sales, by Ship Mode, filtered to the "Technology" category. Some implementations generate the query shown in FIG. 9B. The physical join tree is the Line Items table 502 (for the measure), the Orders table 504 (for the dimension), and the Products table 506 (for the filter). The measure subtree is the Line Items table 502. In this case, there are two disjoint dimension subqueries: Orders (for the dimension) and Products (for the filter 906). Some implementations left outer join (902) the measure subquery (sometimes called the measure subtree) and a de-duplicated Ship Mode dimension subquery 904 on the keys from the relationship. Next, some implementations left join (912) this result with the de-duplicated dimension subquery 908. Some implementations add a sentinel calculation (e.g., the sentinel 910) on top of filters (e.g., the filters 906 and 914). Some implementations add a filter to only keep rows for which the sentinel value is non-null to ensure that the filter is respected, given the left outer joins. Some implementations swap the order in which the dimension and dimension-measure subgraphs are joined while obtaining the same results.

Figure 10A:
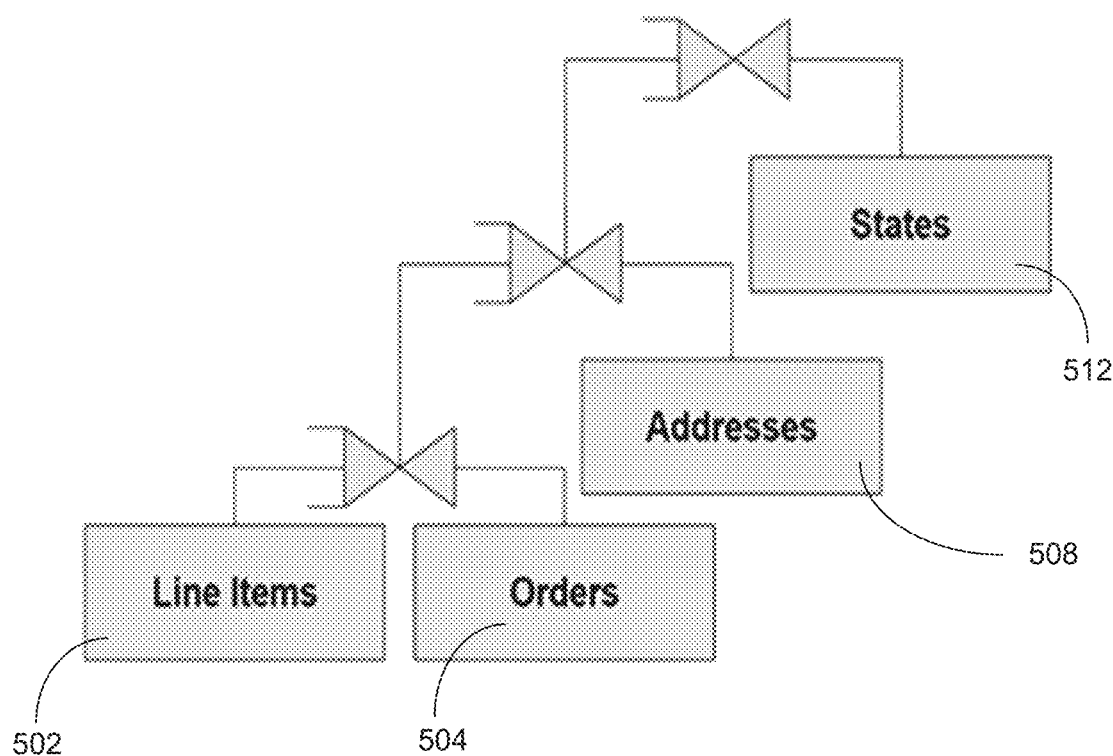
FIGS. 10A and 10B illustrates example queries, in accordance with some implementations.
Figure 10B:
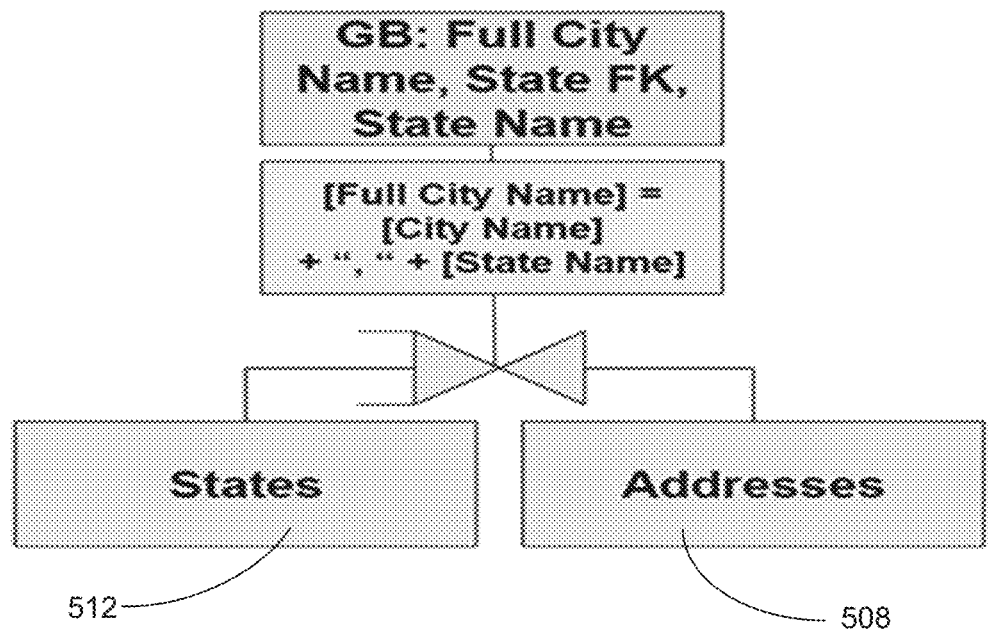

FIGS. 10A and 10B illustrate examples of optimized queries, in accordance with some implementations. Some implementations generate optimized queries when information about relationship cardinalities and/or primary keys is available.

In some implementations, when computing the measure subtree component, the system pulls in tables that can be reached via chains of many-to-one or one-to-one links. To illustrate, for the States and Line Items subquery described above in reference to FIG. 7, some implementations leverage the fact that all the links are many-to-one to expand the measure subtree to include all the tables. This query, illustrated in FIG. 10A, is simpler than before. In particular, unlike the query in FIG. 7, the query shown in FIG. 10A does not have any "Group-By" operations (e.g., the operation 704). Some implementations perform this optimization without knowing all the cardinalities of the edges. For example, the optimization requires only knowing that the three relationships between the tables 502, 504, 508, and 512, are many-to-one, but it does not require knowing any information about the rest of the tree (the object model shown in the FIG. 5A). Even with partial information, some implementations generate optimized queries. For example, if it were known that the Line Items-Orders link was many-to-one, some implementations perform partial optimization by including the Line Items and Orders tables in the measure subtree, and the Addresses table joined to the States tables in the measure subtree.

In some implementations, if the dimension/measure subtree joins against the measure subtree exclusively along many-to-one and one-to-one links, then when computing the measure subtree, the set of tables shared by the measure and dimension/measure subtree is replaced with the de-duplicated dimension/measure subtree. To illustrate, for the query in the example described above in reference to FIG. 8B, if it is known that the relationship between Addresses and States is many-to-one, some implementations simplify the query as shown in FIG. 10B. This optimization is based on the fact that the dimension-measure subtree links to the measure subtree exclusively via many-to-one links (in this case Addresses-States).

Combining Subqueries

Figure 11A:
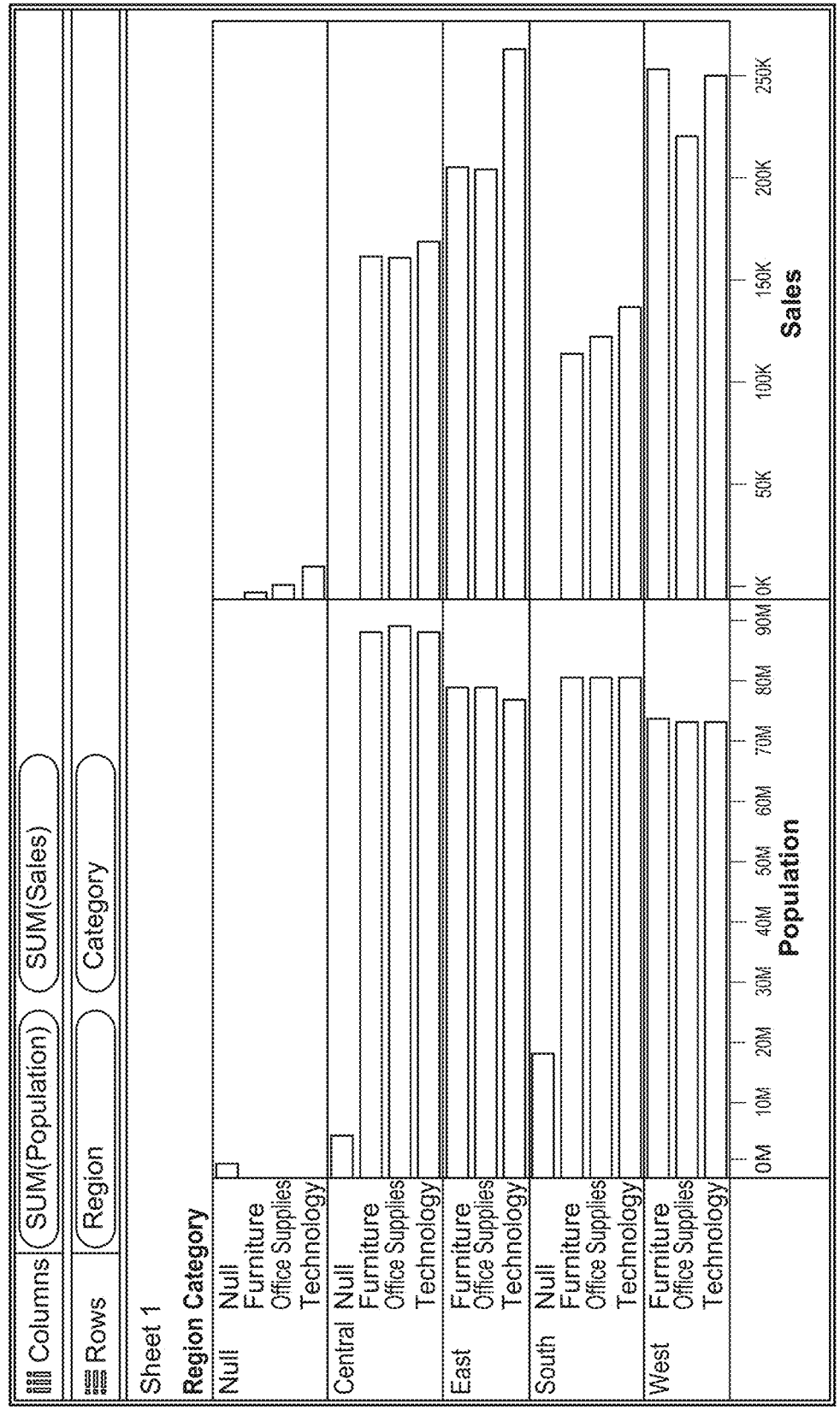
FIG. 11A illustrates a data visualization, in accordance with some implementations.
Figure 11B:
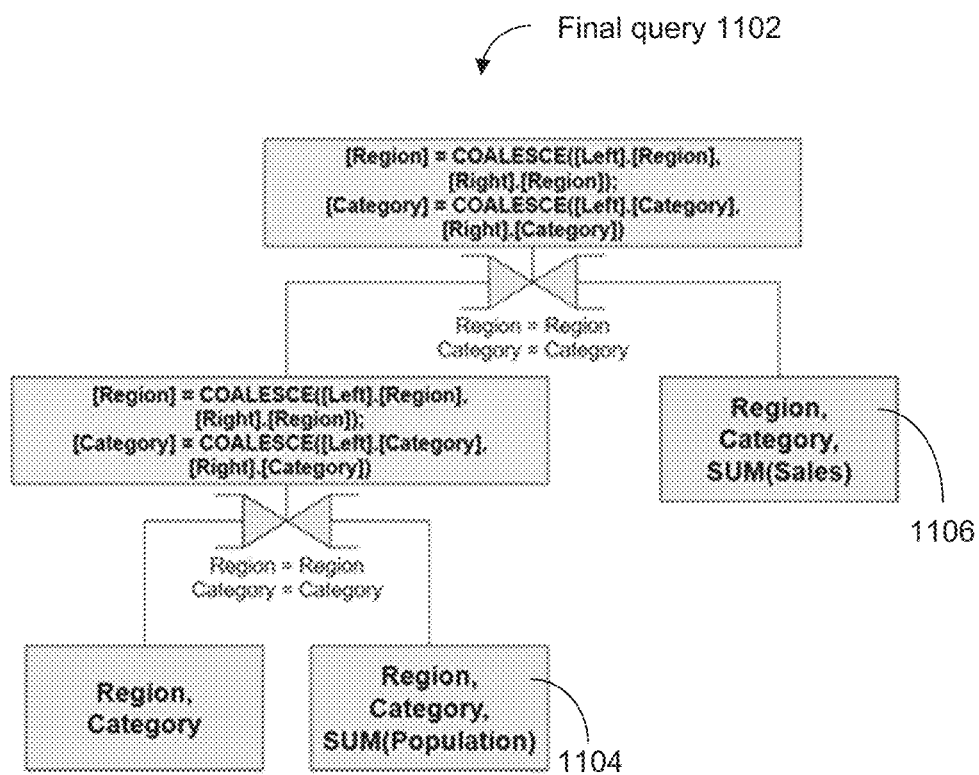
FIG. 11B illustrates an example query, in accordance with some implementations.
Figure 11D:
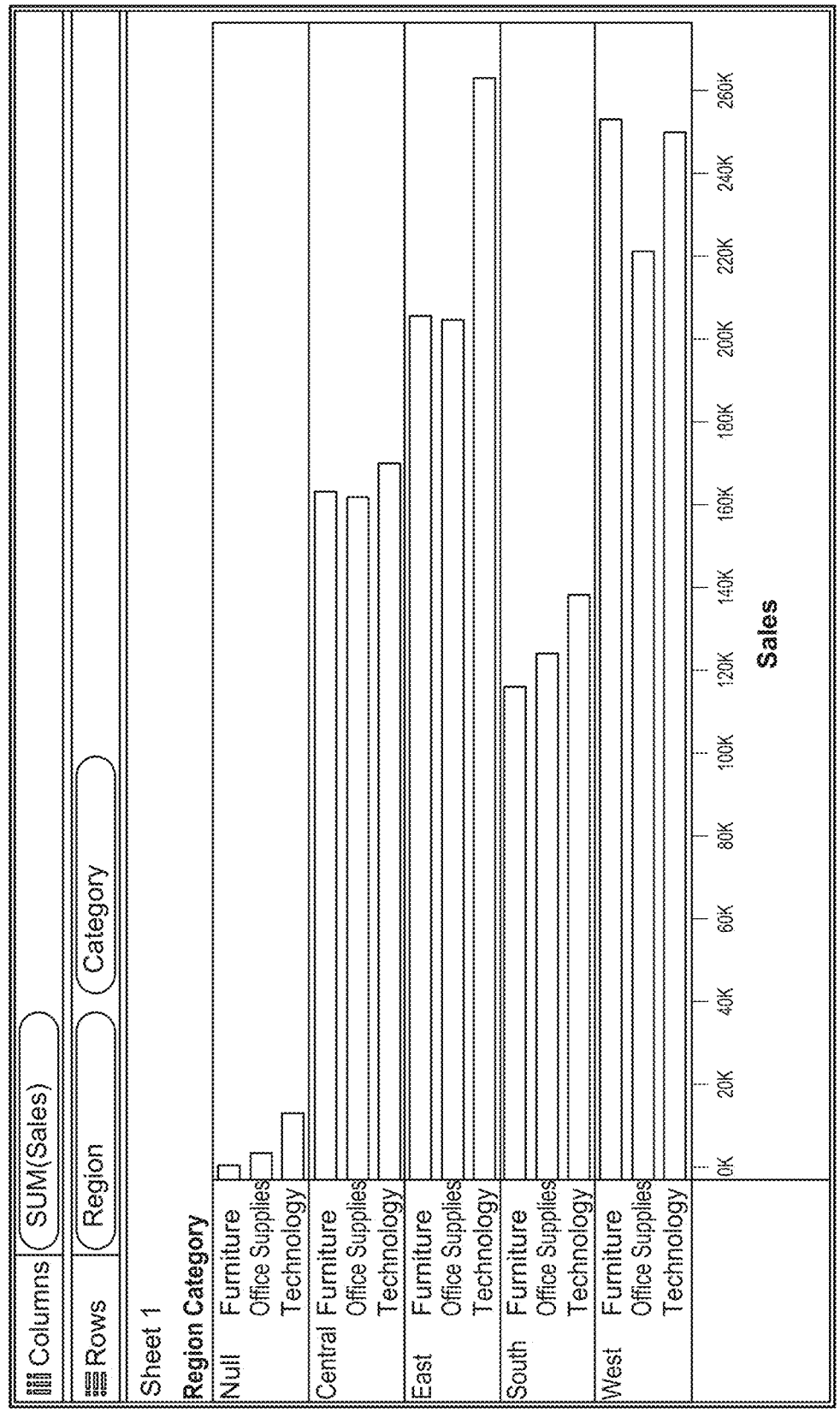
Figure 11E:
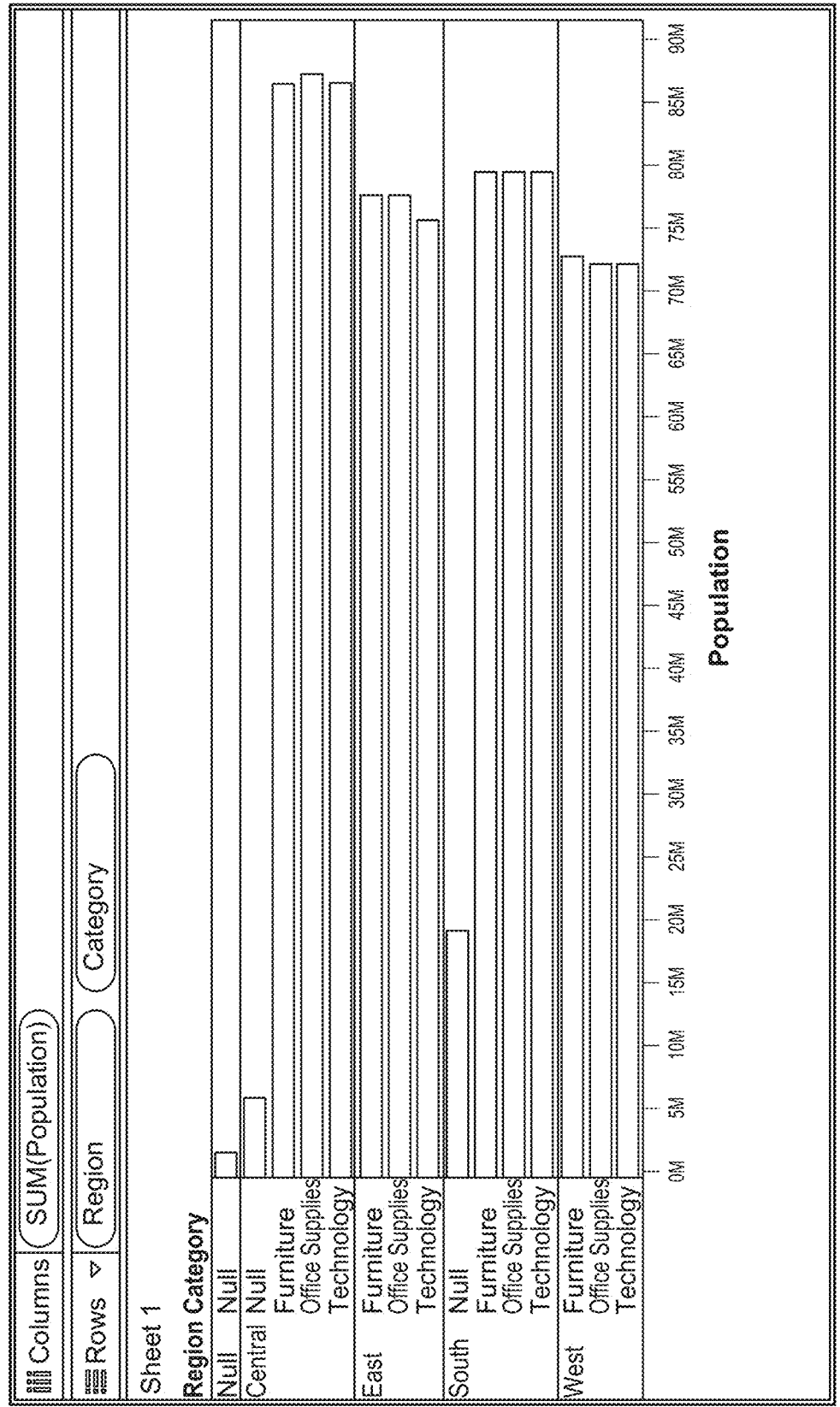

Given a dimension subtree and a subtree for each aggregated measure, some implementations combine these queries to form a final query using outer joins. Some implementations join on the dimensions in the visualization and, after each join, apply a COALESCE on the left and right instances of each dimension. FIG. 11A illustrates a data visualization 1100 that displays sums of Population and Sales (described above), grouped by Region and Category. Some implementations combine the subqueries to form a final query 1102, as shown in FIG. 11B, for the visualization shown in FIG. 11A. In some implementations, each subquery (e.g., the subqueries 1104 and 1106) has a different domain. FIG. 11C illustrates a data visualization 1120 for the dimension subquery (for the example in FIG. 11B), in accordance with some implementations. FIG. 11D illustrates a data visualization 1130 for the subquery for Sum of Sales (with the dimensions), according to some implementations. FIG. 11E illustrates a data visualization 1140 for the subquery for Sum of Population (with the dimensions), according to some implementations.

In some implementations, outer joins ensure that all combinations of the dimensions that appear in at least one subquery are represented. The coalesces ensure that after a join, that all non-null values for each dimension are represented. For instance, (Region, Category)=(Central, Null) only appears on the right side of the outer join when joining in the Population subquery against the rest of the query. If the left side version of the dimensions is chosen, this would result in the erroneous result ((Null, Null). Similarly, if the right side version of the dimensions is chosen, then that would result in (Null, Furniture) from the Sum of Sales subquery.

Figure 11F:
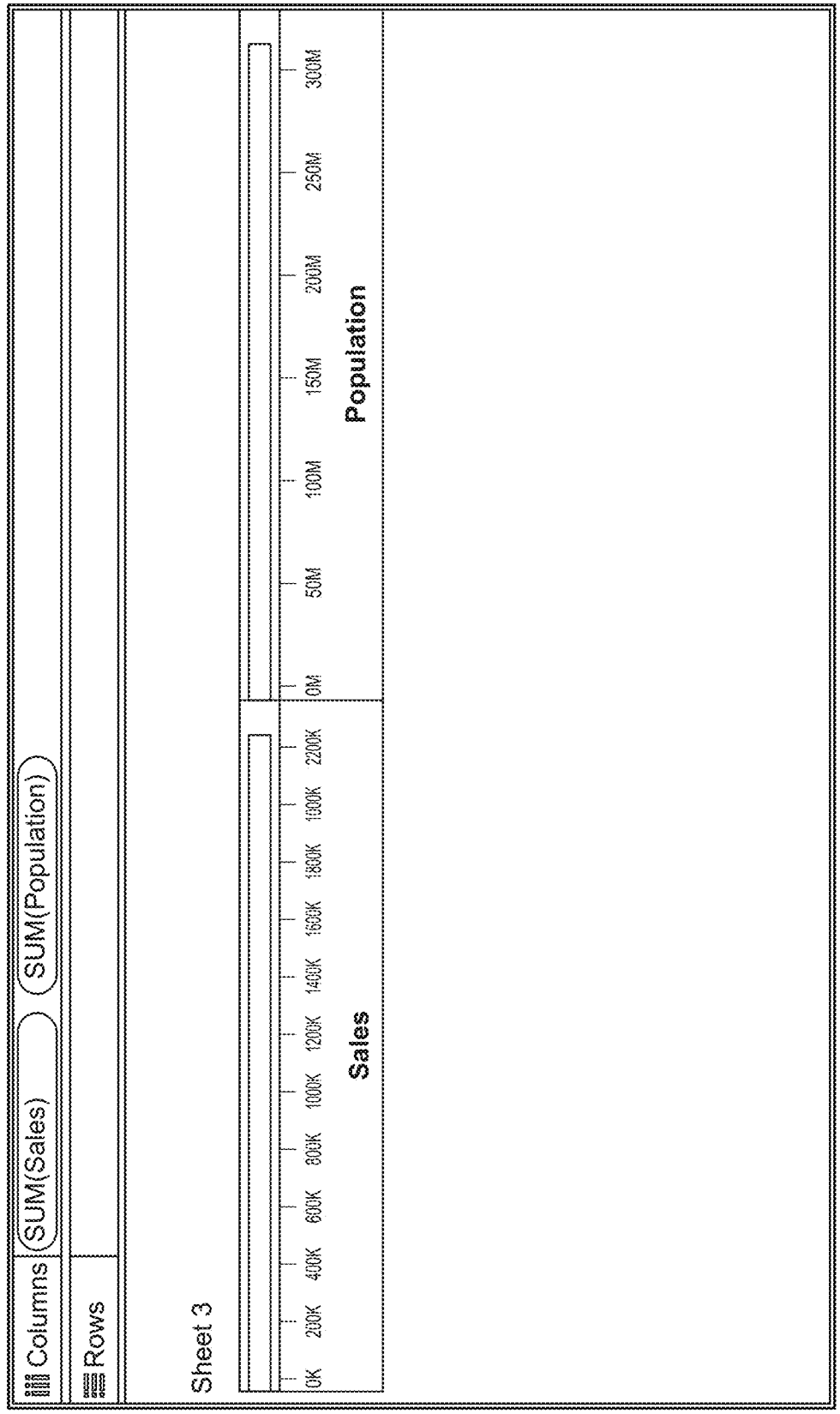

Some implementations perform full joins between the measure subqueries for visualizations without dimensions (e.g., for the visualization 1150 shown in FIG. 11F corresponding to sums of Sales and Population).

Figure 12A:
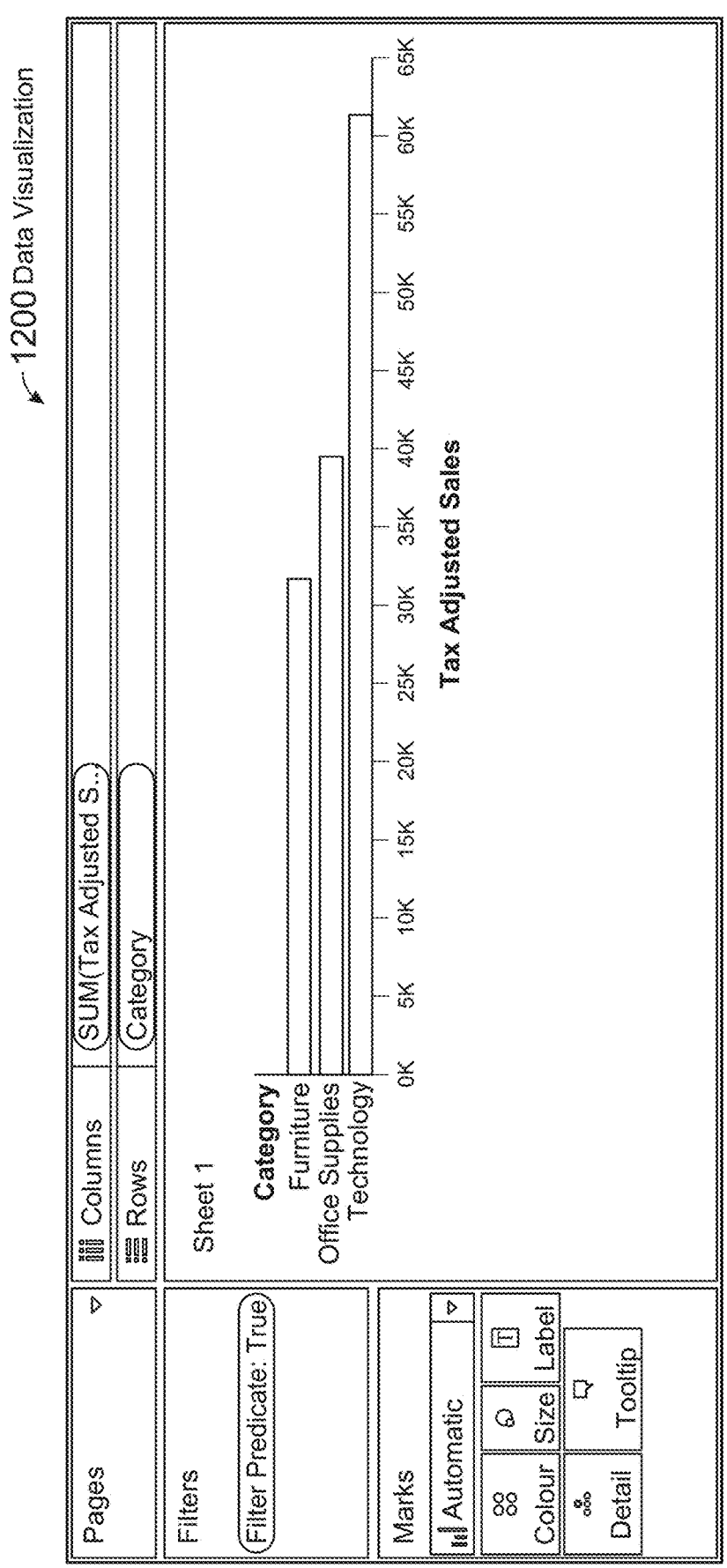
FIG. 12A illustrates a data visualization, in accordance with some implementations.

Some implementations generate visualizations based on the object model for complex queries. To illustrate, suppose a user created a calculation that spanned logical tables such as [Tax Adjusted Sales]=[Sales]*[Sales Tax Rate]. Here, [Sales] comes from the Line Items table 502 and [Sales Tax Rate] comes from the States table 512. Suppose the query also includes a filter predicate calculation of [Segment] ='Home Office' AND [Region]='East', where [Segment] from the Customers table 510 and [Region] comes from the Addresses table 508. Now, further suppose that the user wants to create the visualization SUM([Tax Adjusted Sales]) grouped by Category, where the filter predicate is true. FIG. 12A illustrates a data visualization 1200 generated using the techniques described herein, according to some implementations.

Figure 12B:
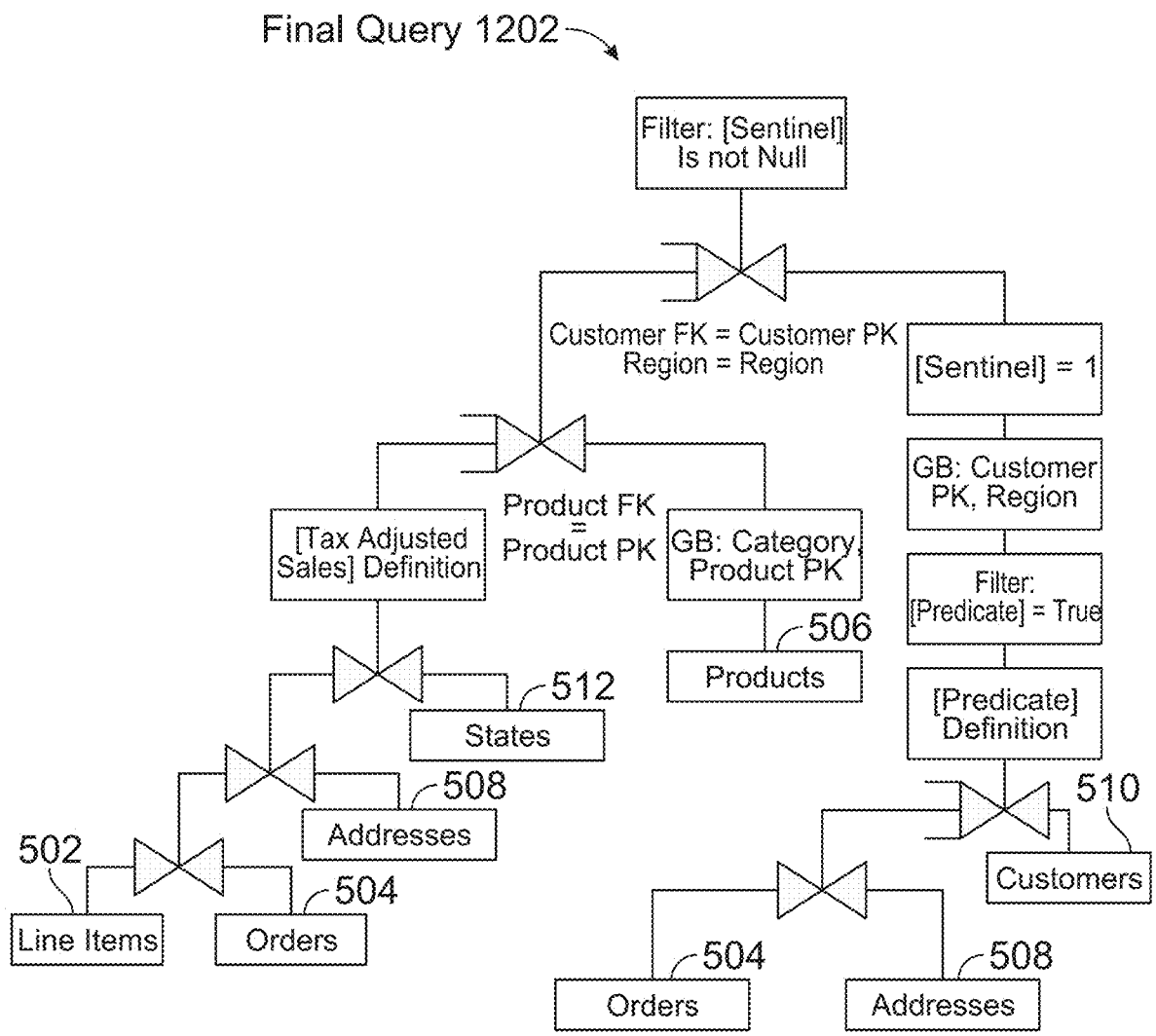
FIG. 12B-12D illustrates example queries, in accordance with some implementations.

Assuming the relationship cardinalities are unknown, some implementations generate a final query 1202 shown in FIG. 12B to compute the measure at its native granularity. For this example, the physical join tree includes the Line Items table 502, the Orders table 504, the Addresses table 508, and the States table 512 (for the measure), the Products table 506 (for a dimension) and the Customers table 510 (which we need for the filter). The measure is a logical field that spans the Line Items, Orders, Addresses and States tables. The measure subtree comprises these tables inner joined together. Some implementations also layer on the definition for [Tax Adjusted Sales].

Some implementations start with two dimension subtrees: Products and Customers. Since the filter on the predicate spans from Customers across to Addresses, some implementations generate a dimension-measure subtree of Orders, Addresses and Customers. For the subtree corresponding to Category, some implementations group Products by Category and the linking key (Product PK) and left join this to the measure subtree. For the dimension-measure subtree, some implementations inner join the tables from the measure subtree together and the left join Customers. Some implementations add the filter predicate logical field and apply the filter. The filter predicate is a calculation with a physical input in the measure subtree [Region]. Therefore, some implementations de-duplicate this subtree on the relationship fields from the Customer-Orders link (since that is the link at which the dimension-only objects links to the measure objects) as well as [Region]. Some implementations join the dimension-measure subtree against the rest of the query using these fields as well.

Figure 12C:
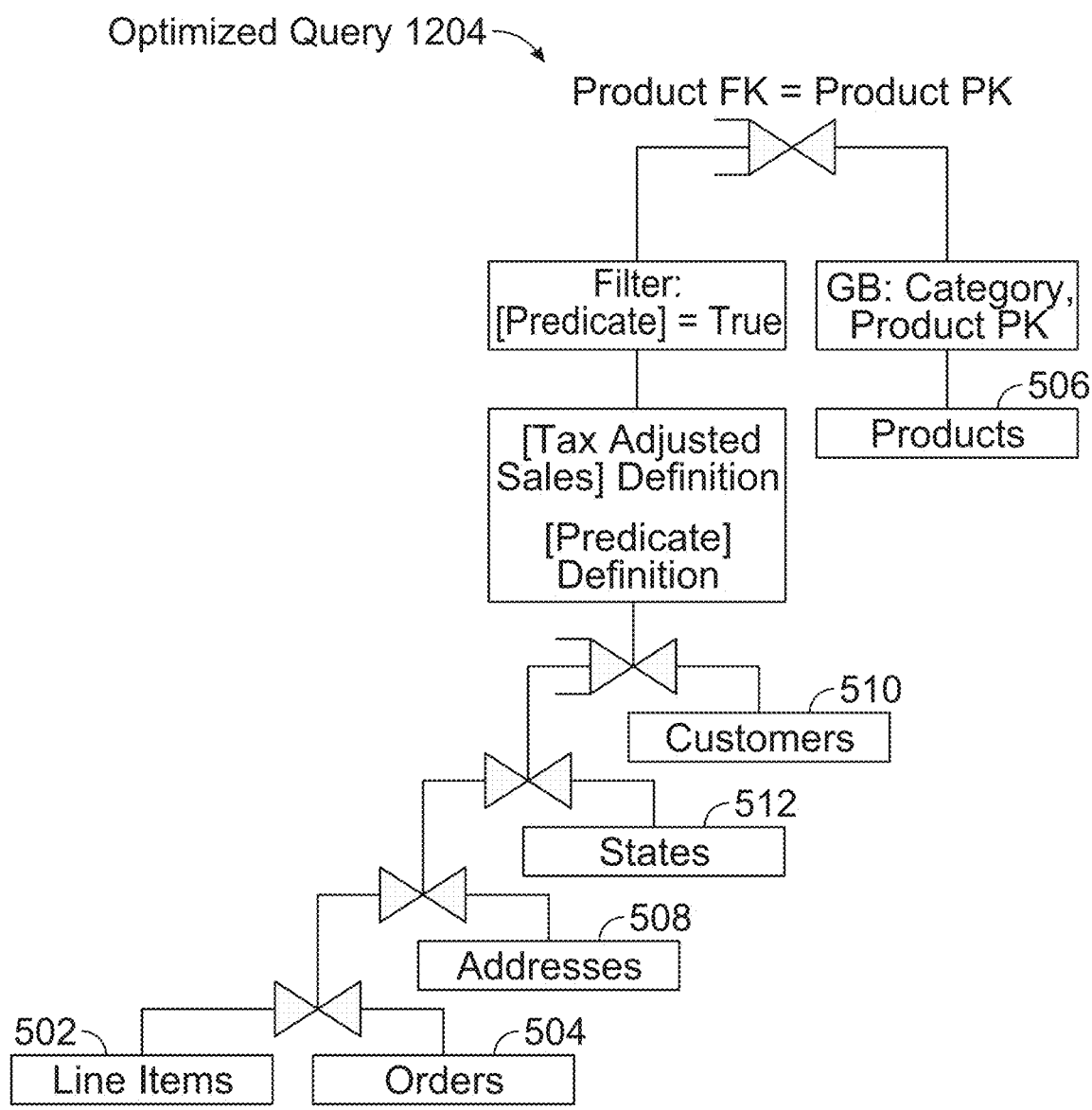
Figure 12D:
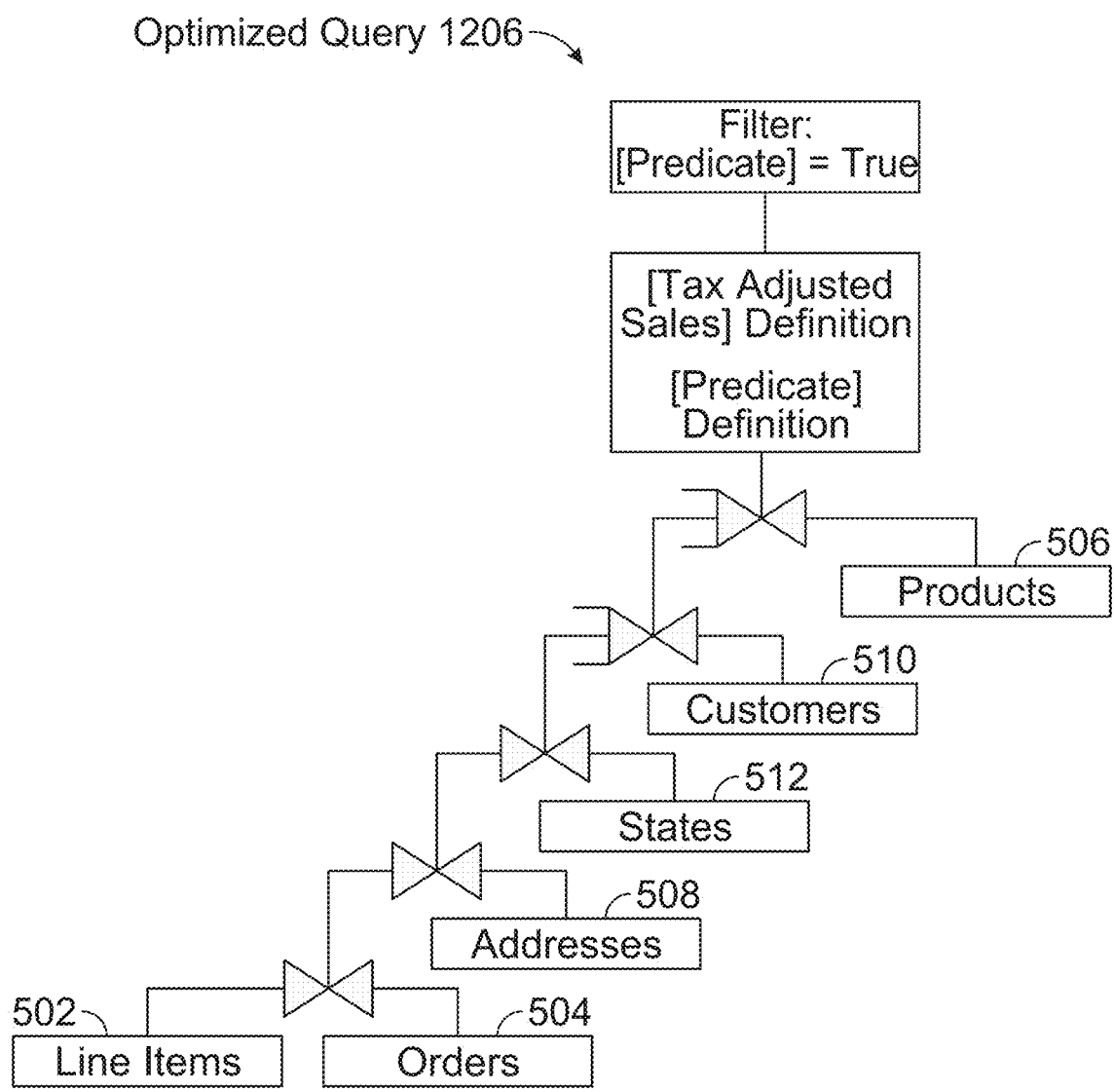

Some implementations simplify the query described above in reference to FIG. 12B. If it is known that the Orders-Customers link is many-to-one, some implementations simplify the query by eliminating the need of the dimension-subquery (because it is known that Customers can be safely joined to the measure subtree without impacting the granularity, as described above in reference to FIG. 10A). FIG. 12C illustrates an example of the optimized query 1204, according to some implementations. Similarly, if it is known that the Line Items-Products link is many-to-one, some implementations apply similar logic to reduce or simplify the query even further as shown by the optimized query 1206 in FIG. 12D.

FIGS. 13A-13D provide a flowchart of a method 1300 for generating (1302) data visualizations using an object model according to the techniques described above, in accordance with some implementations. The method 1300 is performed (1304) at a computing device 200 having one or more processors and memory. The memory stores (1306) one or more programs configured for execution by the one or more processors.

The computer receives (1308) a visual specification 104, which specifies one or more data sources 106, a plurality of visual variables 282, and a plurality of data fields 284 from the one or more data sources 106. Each of the visual variables 282 is associated with either (i) a respective one or more of the data fields 284 or (ii) one or more filters, and each of the data fields 284 is identified as either a dimension or a measure. In some implementations, the visual specification 104 includes one or more additional visual variables that are not associated with any data fields 330 from the one or more data sources 106. In some implementations, each of the visual variables 282 is one of: rows attribute, columns attribute, filter attribute, color encoding, size encoding, shape encoding, or label encoding.

The computer obtains (1310) a data model encoding the data source as a tree of logical tables. Each logical table has its own physical representation and includes a respective one or more logical fields. Each logical field corresponds to either a data field or a calculation that spans one or more logical tables. Each edge of the tree connects two logical tables that are related. The computer generates (1312) a dimension subquery based on logical tables that supply the data fields for the dimensions and the filters. In some implementations, the computer generates the dimension subquery by inner-joining (1314) a first one or more logical tables in the tree of logical tables, wherein each logical table of the first one or more logical tables supplies the data fields for a dimension or a filter.

The computer also generates (1316), for each measure, based on the logical tables that supply the data fields for the respective measure and the filters, an aggregated measure subquery grouped by the dimensions.

Figure 13A:
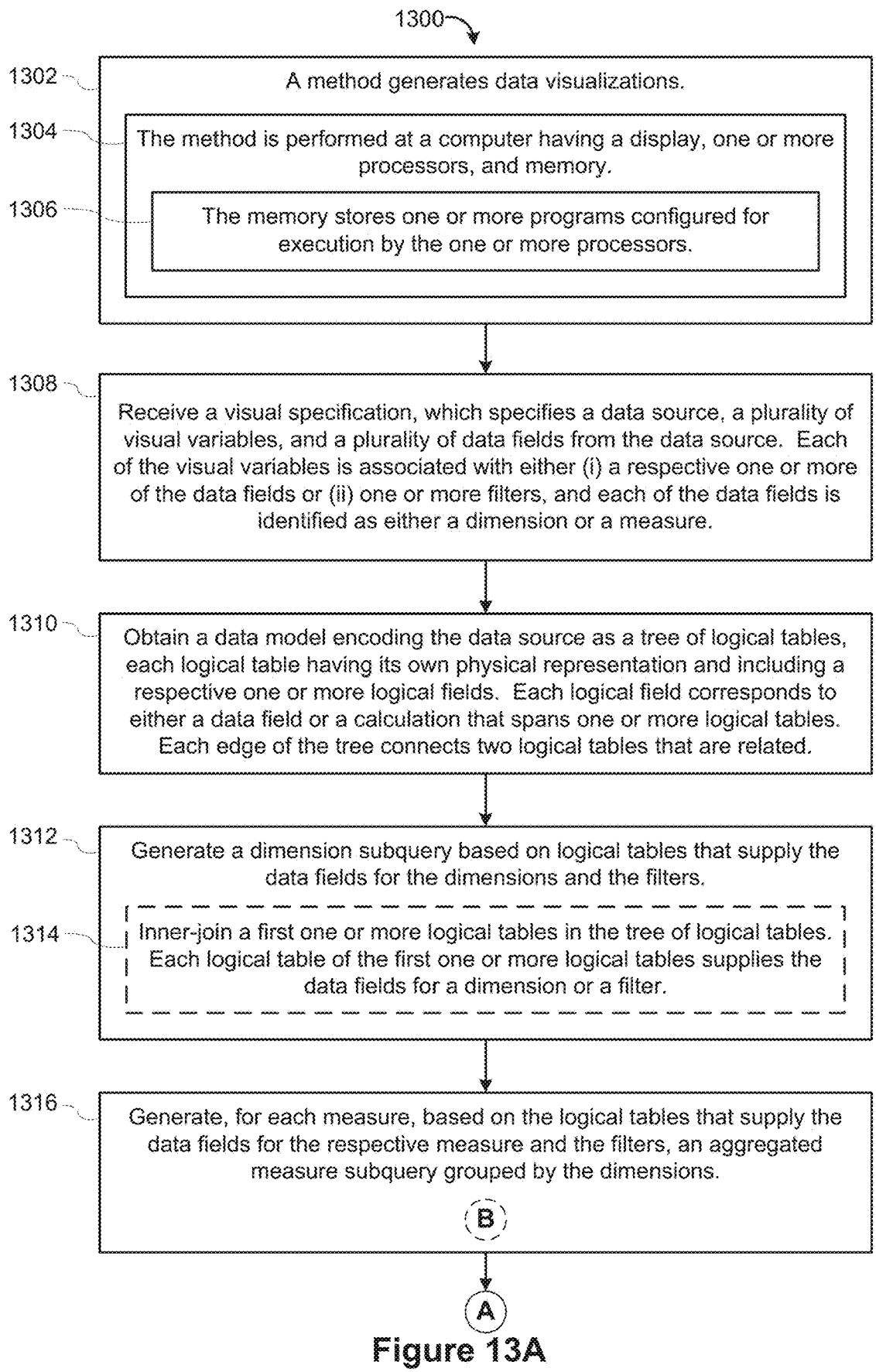
FIGS. 13A-13D provide a flowchart of a method for generating data visualizations using an object model, in accordance with some implementations.
Figure 13B:
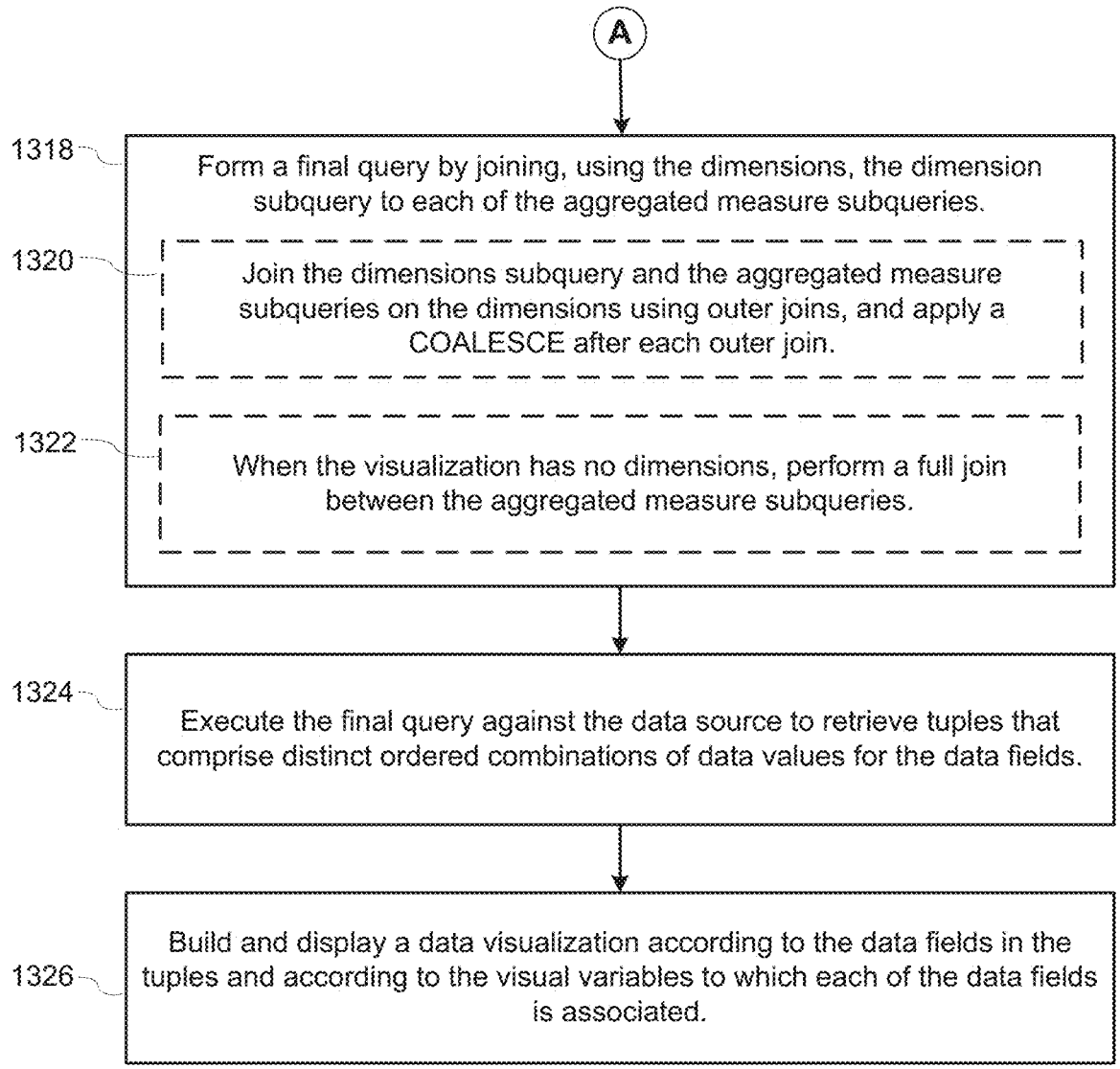

Referring next to FIG. 13B, the computer forms (1318) a final query by joining, using the dimensions, the dimension subquery to each of the aggregated measure subqueries. In some implementations, the computer forms the final query by joining (1320) the dimensions subquery and the aggregated measure subqueries on the dimensions using outer joins, and applying a COALESCE after each outer join. In some implementations, when the visualization has no dimensions, the computer performs (1322) a full join between the aggregated measure subqueries to form the final query. Some implementations use a special table (called Table Dee in some Tableau products) with an empty schema and a single row to represent visualizations without dimensions, and determine if a given visualization has no dimensions by checking if a base table in the dimensions subquery is the special table. Some implementations also use the special table for constant values. For example, SUM(1) is evaluated to the value 1 projected on top of the special table. Since the special table has one row, SUM(1) evaluates to the value 1. In some implementations, if none of a logical field's inputs belong to any table, the field is evaluated using the special table.

The computer subsequently executes (1324) the final query against the data source to retrieve tuples that comprise distinct ordered combinations of data values for the data fields. The computer then builds and displays (1326) a data visualization (e.g., in the graphical user interface 102 for the computing device 200) according to the data fields in the tuples and according to the visual variables to which each of the data fields is associated.

Figure 13C:
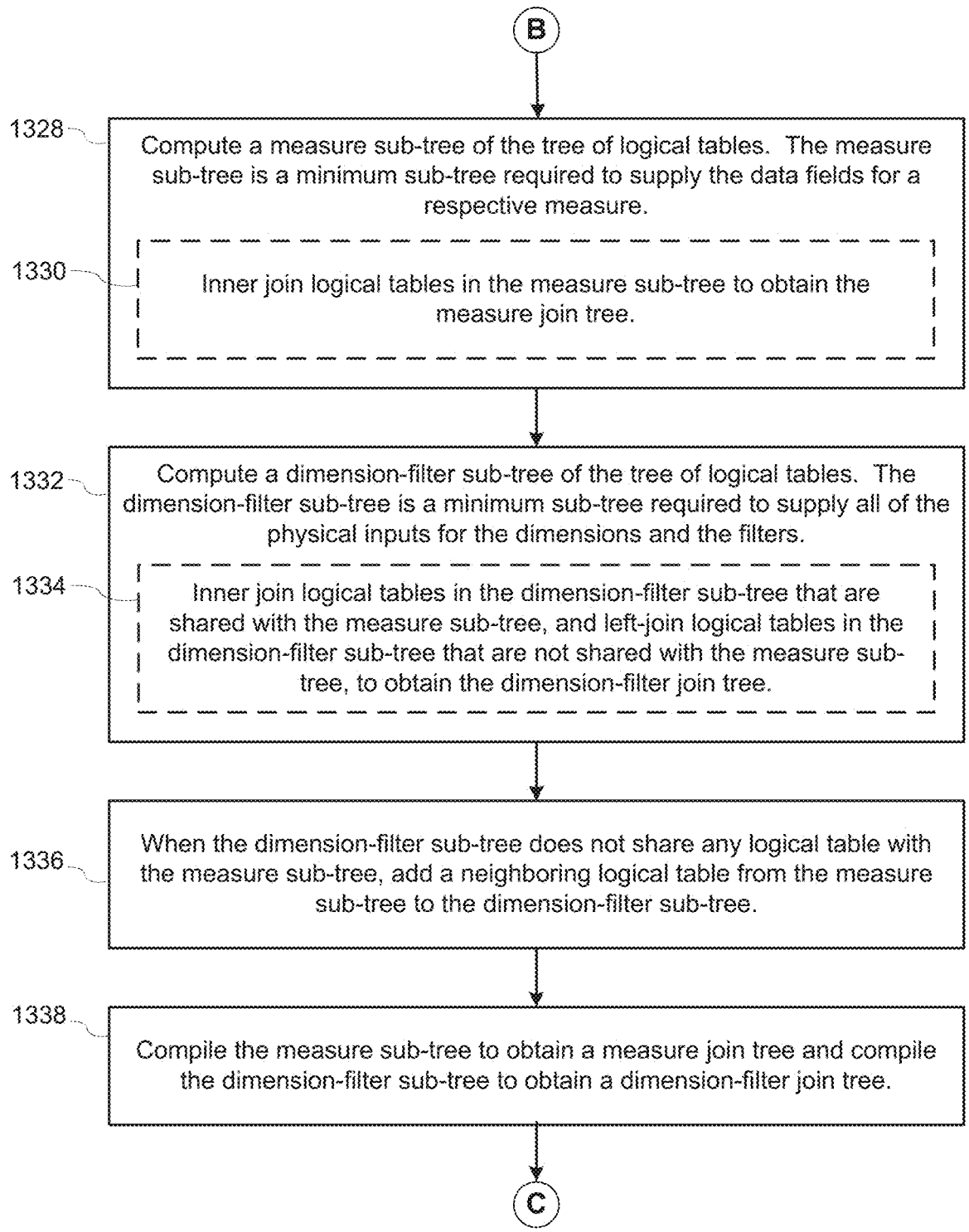

Referring next to FIG. 13C, in some implementations, the computer generates each aggregated measure subquery by performing a sequence of operations. The computer computes (1328) a measure sub-tree of the tree of logical tables. The measure sub-tree is a minimum sub-tree required to supply the data fields for a respective measure. In some implementations, the computer compiles (1330) the measure sub-tree by inner joining logical tables in the measure sub-tree to obtain the measure join tree. Using an inner-join helps ensure that the order of joins does not matter, thereby providing consistent semantics when computing granularity.

Inner joins provide native-level granularity for measures. There will be multiple tables in the measure sub-tree only if it is a calculation. Most of the time, though, the measure sub-tree includes a single table. When a calculated field spans multiple tables, the field's native granularity is its inputs joined together. The computer also computes (1332) a dimension-filter sub-tree from the tree of logical tables. The dimension-filter sub-tree is a minimum sub-tree required to supply all the physical inputs for the dimensions and the filters. (For a non-calculated dimension field, the physical input is the dimension field itself. For a calculated dimension, the physical inputs are all the data fields needed to calculate the dimension.) In some implementations, the computer computes the dimension-filter sub-tree by inner joining (1334) logical tables in the dimension-filter sub-tree that are shared with the measure sub-tree, and left-joining logical tables in the dimension-filter sub-tree that are not shared with the measure sub-tree, to obtain the dimension-filter join tree. Suppose there is a calculated measure that spans multiple tables in a many-to-one relationship. There needs to be separate instances of that calculation for every distinct combination of rows that can be combined. The inner-join produces that set of rows.

Figure 13D:
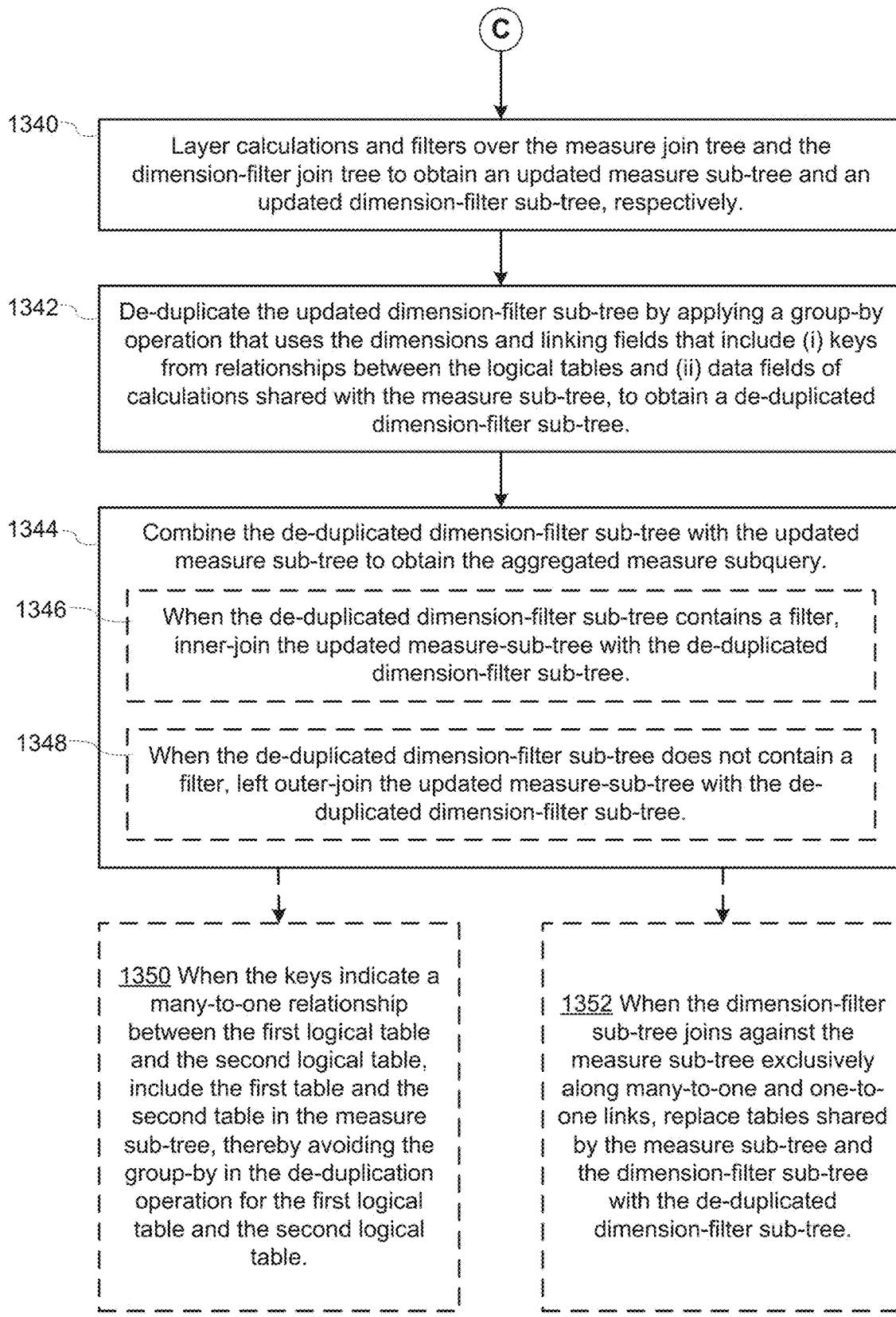

When the dimension-filter sub-tree does not share any logical table with the measure sub-tree, the computer adds (1336) a neighboring logical table from the measure sub-tree to the dimension-filter sub-tree. The computer compiles (1338) the measure sub-tree to obtain a measure join tree and compiles the dimension-filter sub-tree to obtain a dimension-filter join tree. Referring next to FIG. 13D, the computer layers (1340) calculations and filters over the measure join tree and the dimension-filter join tree to obtain an updated measure sub-tree and an updated dimension-filter sub-tree, respectively. The computer de-duplicates (1342) the updated dimension-filter sub-tree by applying a Group-By operation (GB) that uses the dimensions and linking fields that include (i) keys from relationships (e.g., the primary key is equal to the foreign key) between the logical tables and (ii) data fields of calculations shared with the measure sub-tree, to obtain a de-duplicated dimension-filter sub-tree. Suppose there is a dimension that is a calculation. Suppose further that the calculation has physical input fields (sometimes called data fields) that are in the measure part of the dimension-filter sub-tree. Those fields are also linking fields. The Group-By operation finds unique set of dimensions. Some implementations use the linking fields to join back. In some instances, when there are calculations that share fields with the measure sub-tree, some implementations recover the unique rows that the measure came from. In such instances, the joins acts like quasi-packing together primary keys for the measure sub-tree.

The computer subsequently combines (1344) the de-duplicated dimension-filter sub-tree with the updated measure sub-tree to obtain the aggregated measure subquery.

In situations when there are primary keys, some implementations do not use a dimension-filter sub-tree. In such cases, some implementations combine primary keys of all the tables of the measure sub-tree.

In some implementations, the computer combines the de-duplicated dimension-filter sub-tree with the updated measure sub-tree by performing a sequence of operations. The computer determines if the de-duplicated dimension-filter sub-tree contains a filter. When the de-duplicated dimension-filter sub-tree contains a filter, the computer (1346) inner-joins the updated measure-sub-tree with the de-duplicated dimension-filter sub-tree. When the de-duplicated dimension-filter sub-tree does not contain a filter, the computer left outer-joins (1348) the updated measure-sub-tree with the de-duplicated dimension-filter sub-tree.

In some implementations, the computer determines if the keys indicate a many-to-one relationship or a one-to-one relationship between a first logical table and a second logical table. When the keys indicate many-to-one relationship between the first logical table and the second logical table, the computer includes (1350) the first table and the second table in the measure sub-tree, thereby avoiding the Group-By in the de-duplication operation for the first logical table and the second logical table.

In some implementations, when the dimension-filter sub-tree joins against the measure sub-tree exclusively along many-to-one and one-to-one links, the computer replaces (1352) tables shared by the measure sub-tree and the dimension-filter sub-tree with the de-duplicated dimension-filter sub-tree.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating data visualizations, comprising:

at a computer having a display, one or more processors and memory storing one or more programs configured for execution by the one or more processors:
   receiving user selection of one or more data fields from a data source and user placement of the one or more data fields into a shelf region of a user interface, the data source including a plurality of data fields and each of the data fields is either a dimension or a measure;
   in accordance with receiving the user selection and the user placement:
      obtaining a data model encoding the data source as a tree of logical tables, each logical table including a respective one or more logical fields, each logical field corresponding to a measure data field or a dimension data field of the data source, wherein each edge of the tree connects two logical tables that are related;
      generating a dimension subquery based on logical tables that supply the data fields for the dimensions;
      generating, for each measure, based on the logical tables that supply the data fields for the respective measure, a respective aggregated measure subquery grouped by the dimensions;
      forming a final query by joining, using the dimensions, the dimension subquery to each of the aggregated measure subqueries;
      executing the final query against the data source to retrieve tuples that comprise distinct ordered combinations of data values for the data fields; and
      generating and displaying, in the user interface, a data visualization according to the data fields in the tuples.

2. The method of claim 1, further comprising:
   in accordance with receiving the user selection of the one or more data fields and the user placement of the one or more data fields into the shelf region:
      generating a visual specification that specifies the data source and a plurality of visual variables, wherein each of the visual variables is associated with either a respective data field of the data source or a respective filter.

3. The method of claim 1, wherein generating, for each measure, the respective aggregated measure subquery comprises:
   computing a measure sub-tree of the tree of logical tables, wherein the measure sub-tree is a minimum sub-tree required to supply the data fields for the respective measure;
   computing a dimension-filter sub-tree of the tree of logical tables, wherein the dimension-filter sub-tree is a minimum sub-tree required to supply all physical inputs for the dimensions;
   compiling the measure sub-tree to obtain a measure join tree and compiling the dimension-filter sub-tree to obtain a dimension-filter join tree; and
   obtaining the respective aggregated measure subquery based on the measure join tree and the dimension-filter join tree.

4. The method of claim 3, wherein compiling the measure sub-tree comprises inner joining logical tables in the measure sub-tree to obtain the measure join tree.

5. The method of claim 3, wherein computing the dimension-filter sub-tree comprises inner joining logical tables in the dimension-filter sub-tree that are shared with the measure sub-tree, and left-joining logical tables in the dimension-filter sub-tree that are not shared with the measure sub-tree, to obtain the dimension-filter join tree.

6. The method of claim 3, further comprising:
   after obtaining the measure join tree and the dimension-filter join tree:
      layering calculations and filters over the measure join tree and the dimension-filter join tree to obtain an updated measure sub-tree and an updated dimension-filter sub-tree, respectively; and
      de-duplicating the updated dimension-filter sub-tree by applying a group-by operation that uses the dimensions and linking fields that include (i) keys from relationships between the logical tables and (ii) data fields of calculations shared with the measure sub-tree, to obtain a de-duplicated dimension-filter sub-tree.

7. The method of claim 6, wherein obtaining the respective aggregated measure subquery based on the measure join tree and the dimension-filter join tree includes:
   combining the de-duplicated dimension-filter sub-tree with the updated measure sub-tree.

8. The method of claim 7, wherein combining the de-duplicated dimension-filter sub-tree with the updated measure sub-tree comprises:
  determining if the de-duplicated dimension-filter sub-tree contains a filter;
  in accordance with a determination that the de-duplicated dimension-filter sub-tree contains a filter, inner-joining the updated measure sub-tree with the de-duplicated dimension-filter sub-tree; and
  in accordance with a determination that the de-duplicated dimension-filter sub-tree does not contain a filter, left outer-joining the updated measure sub-tree with the de-duplicated dimension-filter sub-tree.

9. The method of claim 7, further comprising:
  in accordance with a determination that the keys indicate a many-to-one relationship between a first logical table and a second logical table of the tree of logical tables:
    including the first logical table and the second logical table in the measure sub-tree, thereby avoiding the group-by in a de-duplication operation for the first logical table and the second logical table.

10. The method of claim 7, further comprising:
  in accordance with a determination that the dimension-filter sub-tree joins against the measure sub-tree exclusively along many-to-one and one-to-one links, replacing tables shared by the measure sub-tree and the dimension-filter sub-tree with the de-duplicated dimension-filter sub-tree.

11. The method of claim 1, wherein generating the dimension subquery comprises inner-joining a first one or more logical tables in the tree of logical tables, wherein each logical table of the first one or more logical tables supplies the data fields for a dimension.

12. The method of claim 1, wherein forming the final query comprises:
  joining the dimensions subquery and the aggregated measure subqueries on the dimensions using outer joins; and
  applying a COALESCE to each outer join.

13. The method of claim 1, wherein forming the final query comprises, in accordance with a determination that the data visualization has no dimensions, performing a full outer join between the aggregated measure subqueries.

14. The method of claim 1, wherein the respective one or more logical fields include a first logical field that corresponds to a calculation that spans one or more logical tables.

15. A computer system for generating data visualizations, comprising:
  one or more processors; and
  memory, wherein the memory stores one or more programs configured for execution by the one or more processors, and the one or more programs include instructions for:
    receiving user selection of one or more data fields from a data source and user placement of the one or more data fields into a shelf region of a user interface, the data source including a plurality of data fields and each of the data fields is either a dimension or a measure;
    in accordance with receiving the user selection and the user placement:
      obtaining a data model encoding the data source as a tree of logical tables, each logical table including a respective one or more logical fields, each logical field corresponding to a measure data field or a dimension data field of the data source, wherein each edge of the tree connects two logical tables that are related;
      generating a dimension subquery based on logical tables that supply the data fields for the dimensions;
      generating, for each measure, based on the logical tables that supply the data fields for the respective measure, a respective aggregated measure subquery grouped by the dimensions;
      forming a final query by joining, using the dimensions, the dimension subquery to each of the aggregated measure subqueries;
      executing the final query against the data source to retrieve tuples that comprise distinct ordered combinations of data values for the data fields; and
      generating and displaying, in the user interface, a data visualization according to the data fields in the tuples.

16. The computer system of claim 15, wherein the instructions for generating, for each measure, the respective aggregated measure subquery include instructions for:
  computing a measure sub-tree of the tree of logical tables, wherein the measure sub-tree is a minimum sub-tree required to supply the data fields for the respective measure;
  computing a dimension-filter sub-tree of the tree of logical tables, wherein the dimension-filter sub-tree is a minimum sub-tree required to supply all physical inputs for the dimensions;
  compiling the measure sub-tree to obtain a measure join tree and compiling the dimension-filter sub-tree to obtain a dimension-filter join tree; and
  obtaining the respective aggregated measure subquery based on the measure join tree and the dimension-filter join tree.

17. The computer system of claim 16, wherein the instructions for compiling the measure sub-tree include instructions for inner joining logical tables in the measure sub-tree to obtain the measure join tree.

18. The computer system of claim 16, wherein the instructions for computing the dimension-filter sub-tree include instructions for inner joining logical tables in the dimension-filter sub-tree that are shared with the measure sub-tree, and left-joining logical tables in the dimension-filter sub-tree that are not shared with the measure sub-tree, to obtain the dimension-filter join tree.

19. The computer system of claim 16, the one or more programs further include instructions for:
  after obtaining the measure join tree and the dimension-filter join tree:
    layering calculations and filters over the measure join tree and the dimension-filter join tree to obtain an updated measure sub-tree and an updated dimension-filter sub-tree, respectively; and
    de-duplicating the updated dimension-filter sub-tree by applying a group-by operation that uses the dimensions and linking fields that include (i) keys from relationships between the logical tables and (ii) data fields of calculations shared with the measure sub-tree, to obtain a de-duplicated dimension-filter sub-tree.

20. A non-transitory computer readable storage medium storing one or more programs configured for execution by a computer system having a display, one or more processors, and memory, the one or more programs comprising instructions for:

receiving user selection of one or more data fields from a data source and user placement of the one or more data fields into a shelf region of a user interface, the data source including a plurality of data fields and each of the data fields is either a dimension or a measure;

in accordance with receiving the user selection and the user placement:

obtaining a data model encoding the data source as a tree of logical tables, each logical table including a respective one or more logical fields, each logical field corresponding to a measure data field or a dimension data field of the data source, wherein each edge of the tree connects two logical tables that are related;

generating a dimension subquery based on logical tables that supply the data fields for the dimensions;

generating, for each measure, based on the logical tables that supply the data fields for the respective measure, a respective aggregated measure subquery grouped by the dimensions;

forming a final query by joining, using the dimensions, the dimension subquery to each of the aggregated measure subqueries;

executing the final query against the data source to retrieve tuples that comprise distinct ordered combinations of data values for the data fields; and generating and displaying, in the user interface, a data visualization according to the data fields in the tuples.

* * * * *